(12) United States Patent
Hu et al.

(10) Patent No.: US 8,060,529 B2
(45) Date of Patent: Nov. 15, 2011

(54) IM CLIENT AND METHOD FOR ITEM SHARING

(75) Inventors: Xiao Wei Hu, Beijing (CN); Qian Liang, Beijing (CN); Yue Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 11/470,299

(22) Filed: Sep. 6, 2006

(65) Prior Publication Data

US 2007/0078938 A1    Apr. 5, 2007

(30) Foreign Application Priority Data

Sep. 9, 2005    (CN) .......................... 2005 1 0098855

(51) Int. Cl.
*H04L 12/62* (2006.01)
*G06F 12/14* (2006.01)

(52) U.S. Cl. .......... 707/785; 709/206; 709/228; 726/28
(58) Field of Classification Search .............. 709/206; 707/785
See application file for complete search history.

(56) References Cited

U.S. PATENT DOCUMENTS

| | | | | |
|---|---|---|---|---|
| 5,113,442 | A * | 5/1992 | Moir .............................. | 713/167 |
| 7,080,139 | B1 * | 7/2006 | Briggs et al. ................... | 709/224 |
| 7,130,880 | B1 * | 10/2006 | Burton et al. .................. | 709/203 |
| 7,490,238 | B2 * | 2/2009 | Roskind ......................... | 713/170 |
| 2001/0028363 | A1 | 10/2001 | Nomoto et al. | |
| 2003/0120734 | A1 | 6/2003 | Kagan et al. | |
| 2004/0068524 | A1 | 4/2004 | Aboulhosn et al. | |
| 2004/0199514 | A1 | 10/2004 | Rosenblatt et al. | |
| 2004/0254934 | A1 * | 12/2004 | Ho et al. ............................ | 707/9 |
| 2005/0004995 | A1 | 1/2005 | Stochosky | |
| 2005/0022132 | A1 | 1/2005 | Herzberg et al. | |
| 2005/0091316 | A1 | 4/2005 | Ponce et al. | |
| 2005/0210396 | A1 * | 9/2005 | Galli .............................. | 715/758 |
| 2006/0117010 | A1 * | 6/2006 | Hakala .............................. | 707/9 |

FOREIGN PATENT DOCUMENTS

WO    WO2004031986 A1    4/2004
WO    WO2005003895 A2    1/2005

OTHER PUBLICATIONS

Zacker, Craig, Building Windows 98 Networks, 2000, p. 21.*
Dusseault, WebDAV: Next-Generation Collaborative Web Authoring, Oct. 27, 2003, pp. 1-8.*
Rask, Implementing Row- and Cell-Level Security in Classified Databases Using SQL Server 2005, Sep. 1, 2005, pp. 1-28.*
Debbabi, Standard SIP-Based Instant Messaging and Presence APIs for Networked Devices, 2002, pp. 59-64.*
Sing, Peer-to-Peer Internet Telephony using SIP Jun. 14, 2005, pp. 1-6.*
Perkins, RFC 2002, Oct. 1996, pp. 1 and 6.*
Whatis.com, Access Control List Definition, Aug. 4, 2000, pp. 1-7.*

* cited by examiner

*Primary Examiner* — John E Breene
*Assistant Examiner* — Albert Phillips, III
(74) *Attorney, Agent, or Firm* — Lee Law, PLLC; Christopher B. Lee

(57) ABSTRACT

The present invention provides a system and method for performing files/folder share between IM clients. In the present invention, when a source client shares out files/folders to a particular contact person/contact person group, an access control list table is established and said particular contact person/contact person group and the files/folders shared out to him are stored in association with each other. When a target client makes a request for accessing information of share items, obtaining items and beginning to receive items, the source client will respectively consult the access control list table to determine whether the request is authorized. Only when the request is authorized, can the source client perform the requesting operations. By means of the present invention, an automatic and flexible file/folder share between IM clients can be achieved.

18 Claims, 23 Drawing Sheets

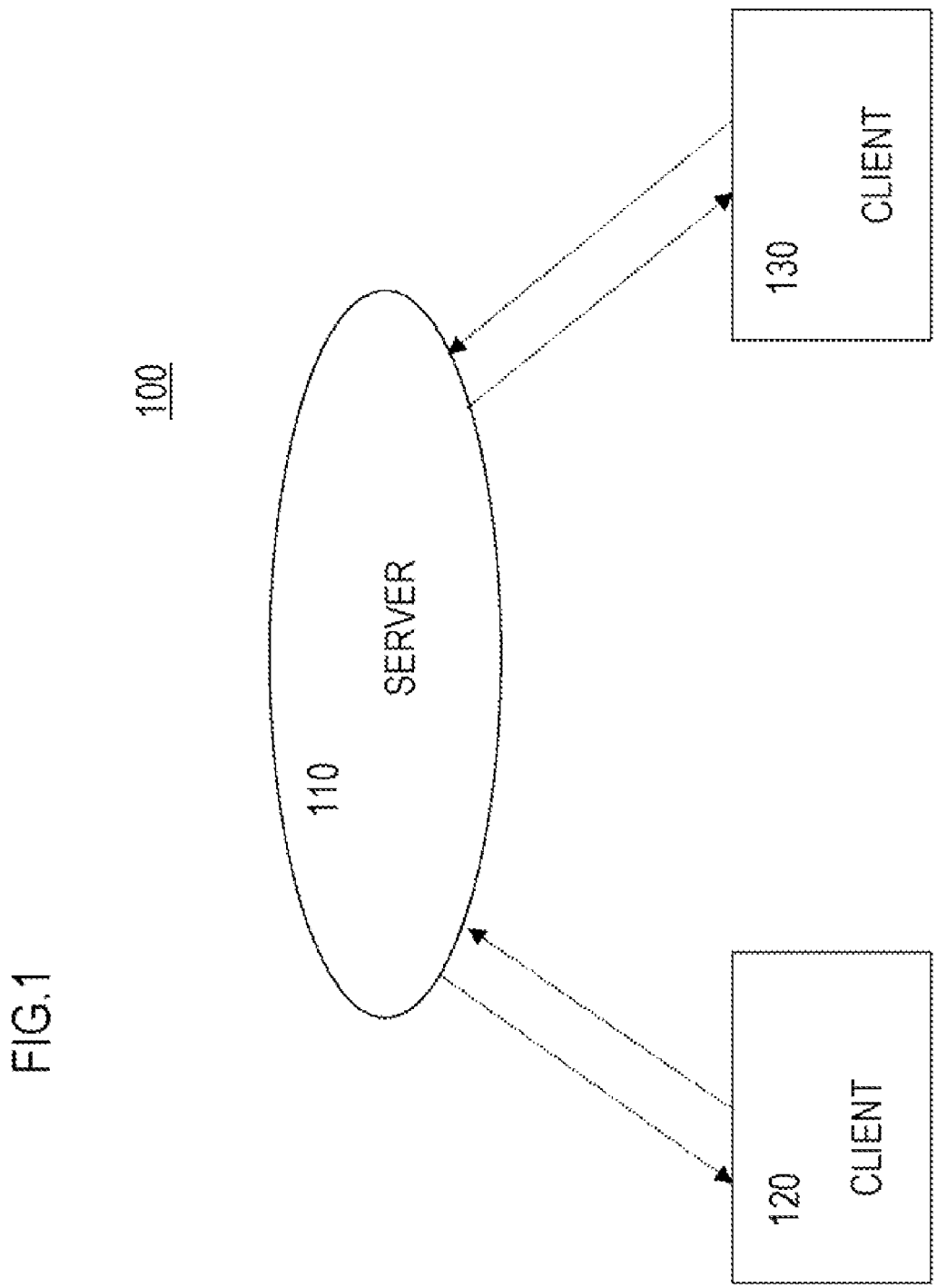

IM CLIENT AND METHOD FOR ITEM SHARING

FIELD OF THE INVENTION

The present invention relates generally to network communication technology. More particularly, the present invention relates to sharing files/folders between clients using Instant Messaging (IM) software.

BACKGROUND

It is well known that networking technology was mastered by a relatively fe technicians and mainly served for political, military and other limited purposes during its initial development period of 1950's and 1960's. However, since then, with the rapid development of computer technologies, the appearance of personal computers, the emergence and prevalence of TCP/IP protocol, and the birth of the Internet, network technologies quickly evolved and were been put into widespread business use. Commercial uses of the Internet have developed at unprecedented speed and have penetrated various social sectors such as the government, medical and educational agencies. The Internet plays an indispensable role in many peoples' daily life.

IM or Instant Messaging, since its general introduction in 1996, has quickly become quite popular. IM began with ICQ software and is characterized by performing real-time communication via a network. IM may already be the most frequently used type of network software and is no long considered to be just a technical tool. It is considered to be the symbol of modern communications and has constructed a new social relationship. Various implementations of IM software have emerged; for example, QQ, MSN, Yahoo Messenger, AOL Instant Messenger, etc. With the development of such applications, today's IM products form a comprehensive network communication tool.

IM is quite similar to a telephone service, but the telephone performs communication through human voice while IM performs communication based on texts. However, with the constantly-changing user demand, IM can provide more diversified services and be applied to a wider range of areas. The users are not satisfied with merely text communication via IM software. They also desire to share files through IM.

Nevertheless, it is not easy to share files with current IM software. Two scenarios are explained as follows.

Scenario 1

Suppose User A has a lot of music files and he wants to share them with User B, but User B only needs part of the music of User A instead of all the music. In this situation, a conventional process of the current IM software is:

User A chats with User B and tells User B all the music files he has;

User B goes through all User A's files and tells User A which ones he needs; and User A sends User B the needed music files to realize the "share" object.

This sharing can be realized using the following ways:

1) "File Send" function: most IM software support this function;
2) "File Share" function: a few IM software applications (e.g., AIM) support this function but can only share the specified folders;
3) as Email attachment;
4) if in LAN, using the file share function of Windows.

Scenario 2

Suppose User A has a lot of music files and he wants to share some of the music files with User B and share others with User, C, but User B and User C are placed in different groups of User A's contact list (or buddy list).

If the IM software (e.g., AIM) which supports the "File Share" function is used, the user first needs to designate a folder for sharing with others and copy into the folder a file for sharing with User B. Then, User A sets the authority of User B's group to have access to the shared folder so that User B can access the shared folder and obtain the file. After User B gets the needed file, User A deletes all the files from the shared folder. Then User A copies the files which he wants to share with User C into the folder and sets the authority of User C's group to have access to the shared folder so that User C can access the shared folder and get the file.

It can be seen that, in both Scenarios, it is impossible to realize automatic and flexible file sharing between IM software users. Manual operations and intervention are needed instead.

In U.S. patent application US2004/0199514A1, entitled "Techniques for Facilitating Item Sharing" and granted to I. Rosenblatt et al. on Oct. 7, 2004, a technical solution for file sharing through IM software is described. The "File Share" function in item 2) of Scenario 1 and the case of Scenario 2 are similar to the solution presented in this patent. In this patent, a share window is used to maintain a list of shared files/folders, and a user can add files/folders for sharing with others to the share window, and other users can only access the files and folders listed in the share window.

Moreover, U.S. patent application US2004068524, entitled "Peer-to-peer File Sharing", and granted to A. Amir et al. on Apr. 8, 2004, discloses a shared folder is established among a plurality of users and the content of the folder is shard among these users. The files in the shared folder may exist in computers of different users. However, this patent does not particularly concern file sharing through IM software, and needs to establish a virtual file to realize sharing.

It can be seen that, a workable solution capable of performing file/folder sharing between IM software users is needed.

SUMMARY OF THE INVENTION

The present invention provides an IM client, server, system and method for item sharing. By using the present invention, on one hand, the users owning items can easily share the items with other users; on the other hand, the users hoping to share items of others can easily view and/or obtain those shared items. Here, "items" may be "files and/or folders".

According to a first aspect of the present invention, a first IM client for sharing items with one or more second IM clients is provided, the one or more second IM clients being a contact person/contact group of the first IM client. The first IM client includes contacts storage for storing information of contact persons/contact groups; item storage for at least storing items for sharing with contact persons/contact groups; a selecting element for selecting a contact person/contact group from the contacts storage with whom the first IM client wants to share and for selecting items for sharing from the item storage; and an access control list table generator for generating an access control list table in response to the selections of the selecting element, said access control list table storing identification information of the selected contact person/contact group and of the selected items.

BRIEF DESCRIPTION OF THE DRAWINGS

FIG. 1 is a schematic view showing the constitution of a conventional IM system.

DETAILED DESCRIPTION

The preferred embodiments for carrying out the present invention are explained below with reference to the drawings.

FIG. 1 is a schematic view showing the constitution of a conventional IM system The IM system 100 includes an IM server 110 and a plurality of IM clients connected to said IM server 110. Here, for the sake of clarity, only IM clients 120 and 130 are shown. However, it should be understood that, there can be any number of IM clients connected to the IM server 110.

If an IM client (120 or 130) wants to join in the IM communication, the IM client first needs to register with server 110 before it can perform IM communication (e.g., chatting) with other clients. The communication between respective IM clients is peer-to-peer. For some IM software, the communication between the respective clients needs to be transferred by the server, while for others, direct communication between the clients can be performed without the server.

The present invention provides a mechanism for file sharing between the IM clients. For ease of description, the IM client having the files and/or folders to be shared is referred to as the "source client" and its user as the "source user", while an IM client desiring to obtain files and/or folders from others is referred to called as a "target client" and its user as a "target user".

Modification to the User Interface

1. Source Client

According to the preferred mode of the present invention, a source client can share files and/or folders on a user interface through the following three modes:

Mode 1

Figure 2A:
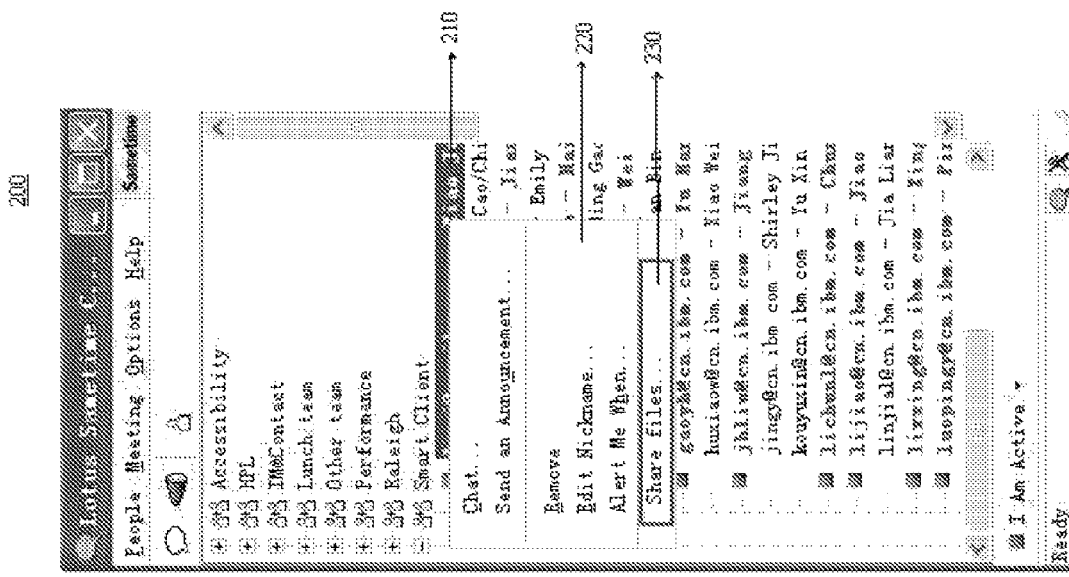
FIG. 2 consisting of FIGS. 2A and 2B, shows a user interface when a source client wants to share files and/or folders with others from within IM software.

FIG. 2A shows a user interface when a source client shares files and/or folders from IM software (is the illustration is from a current release of the "IBM Lotus Sametime" IM product).

The user interface 200 as shown in FIG. 2A comprises a "buddy list" or plurality of contact persons of the source client as represented by email addresses. Assume the source client wants to share files with one contact person 210. The source client can right click to display a contact-sensitive menu 220. The displayed menu 220 includes a new "share files" menu item 230, in addition to the existing IM menu items. The source client can click on the "share files" menu item 230 to pop up a dialog box (not shown) and select therefrom the files and/or folders for sharing with the contact person 210.

Mode 2

Figure 2B:
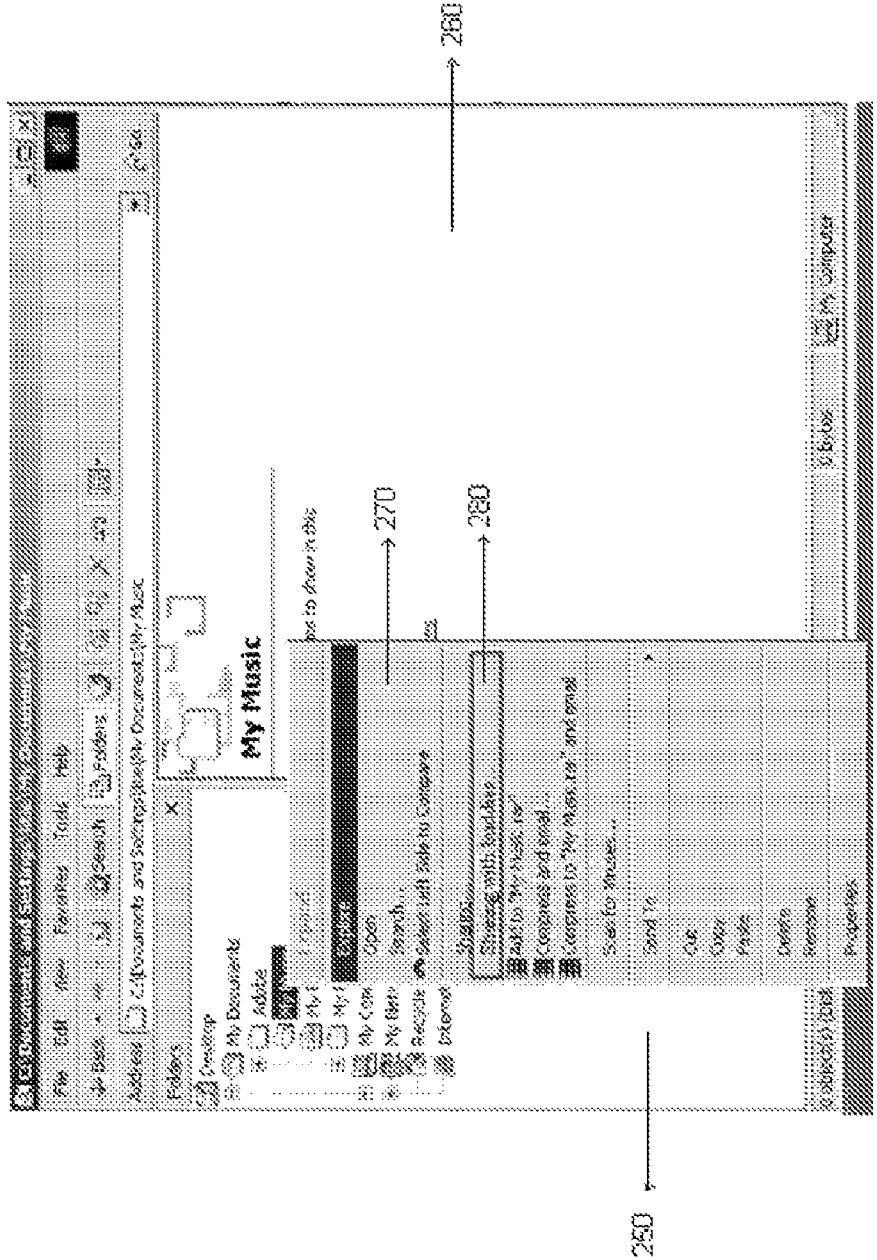

FIG. 2B shows a user interface when a source client shares files and/or folders from the resource manager of a current release of the Windows operating system.

The user interface 240 as shown in FIG. 2B includes two browser panes 250 and 260. The left pane 250 represents a file/folder directory on the system desktop. If, as an example, the source user wants to share the "My Music" folder therein, he can right click to display a contact-sensitive menu 270 for the "My Music" folder as well as the content of the folder in the right pane 260. In addition to other menu options which the resource manager itself should have, the menu 270 also includes a new "Sharing with buddies . . . " item 280. When the source user clicks on the "Sharing with buddies . . . " menu item 280, a dialog box (not shown) will pop up, so that the source user can select therefrom the user or user group with whom to share the "My Music" folder.

It should be understood that, while Windows operating system is used as an example, the present invention is not limited to this system but can be used in any operating system (e.g., Mac OS) including IM software.

Mode 3

In this mode, a new function menu item, e.g., "File Share", can be given in a menu bar of the current IM software. When a user clicks on this menu item, a dialog box will pop up so that the user can select therefrom which files and/or folders are to be shared and also to select a user/user group whom the user wants to share those files and/or folders.

2. Target Client

Figure 3:
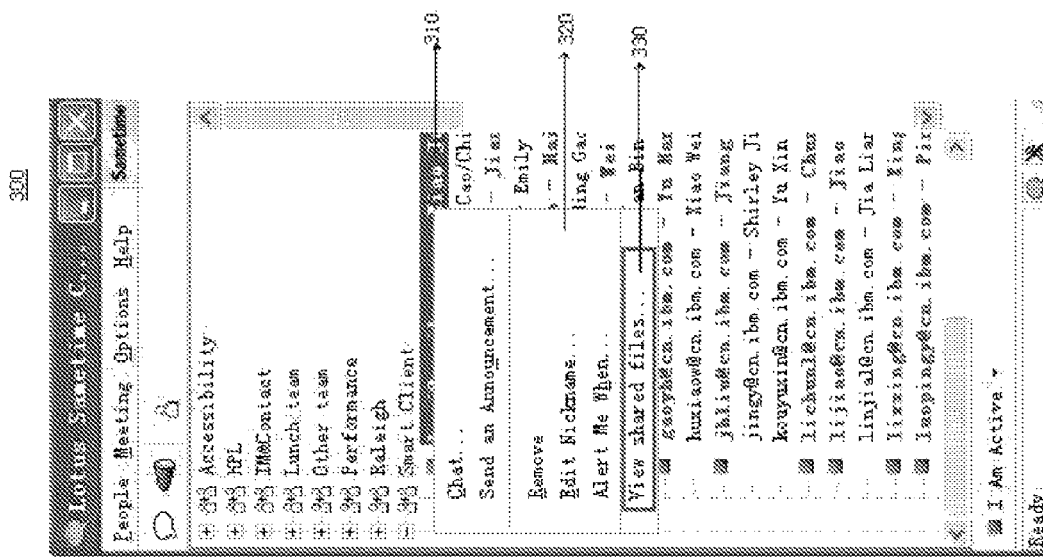
FIG. 3 shows a user interface when a target client wants to views files and/or folders are shared by a source client.

FIG. 3 shows a user interface at the time when a target client views which files and/or folders are shared by a source client.

The user interface 300 as shown in FIG. 3 comprises a plurality of contact persons of the target client as represented by email addresses. If the target client wants to view the files and/or folders shared by contact person 310, he may right click to display a context-sensitive menu 320 of the contact person 310. The displayed menu 320 includes a new "view share files" menu item 330, besides the existing IM menu items. The target user may click on the "view shared files"

menu item 330, Then a dialog box (not shown) will pop up, which displays a list of the files and/or folders shared by the source user (if any).

The above uses the user interface of IBM Lotus Sametime IM software to illustrate the necessary modifications to the user interface for implementing the present invention as well as exemplary new menu items (e.g., "share files", "view shared files"). However, it should be understood that, the present invention is also applicable to other IM software, and additionally, the text of the given menu item can be modified as needed.

Access Control List Table

In the present invention, a source client needs to maintain an access control list table for indicting with whom the source client is willing to share files and/or folders and what files are to be shared. This can be considered as an authorization to the target user, so that if a target client wants to access the files and/or folders shared by the source client, he has to be included in the access control list table of the source client and can only access those files associated to him. Table 1 shows the data structure of an access control list table according to the preferred mode of the present invention.

TABLE 1

| ID | IDTYPE | SHARENAME | PATHNAME |
|---|---|---|---|
| User 1 | U | My Music | C:\Documents and Settings\peter\My Documents\My Music |
| User 2 | U | Sunset.jpeg | C:\Documents and Settings\peter\Documents\My Pictures\sample pictures\Sunset.jpeg |
| ... | ... | ... | ... |
| User n | G | Recent | C:\Documents adn Settings\peter\Recent |

In Table 1,

ID field: representing an identifier of each target user, wherein the target user may be a single user or a user group.

IDTYPE field: optional, representing whether the type of the target user is a single user or a group. In Table 1, "U" exemplary represents a single user and "G" represents a user group.

SHARENAME Field: representing a name with which items are to be shared. By default, it is the name of a top level share file/folder. For example, as to User 1, since all the sub-folders and files in My Music folder are to be shard, the share name is the name of the top level folder, i.e., "My Music"; as to User 2, Sunset.jpeg is a top level share file, so the same name is Sunset.jpeg.

PATHNAME field: representing the absolute path of the share files and/or folders in the source client.

The above only lists several possible fields in an access control list table, but those skilled in the art will understand that other fields can also be added as needed.

It can be seen from the data structure in Table 1, the access control list table stores information identifying target users in association with information identifying items the source client may share with those users.

Each row of the access control list table represents a target user. When files and/or folders are shared to one target client, one row will be added to the table. According to the preferred mode of the present invention, if plural items may be shared with a particular target user, a new row can be established for each such item.

The row of an access control list table can be generated manually by the source user when he has shared files and/or folders to a target user, or preferably can be generated automatically by the IM software. It is easy for the IM software to automatically generate rows of a list table based in inputs provided by the source client.

The access control list table can be stored in a local database or file of the source client. In addition, for security consideration, the list table may be encrypted.

By using this access control list table, the source client is capable of sharing different files or folders with different users, which significantly improves share flexibility, a compared with the prior art.

Configurations and Operations of Source Client when Sharing Files/Folders

A source user can set share files/folders for a target user by using one of the three modes mentioned in the "Modification to User Interface" Section. When the source user enables the possible sharing, the corresponding target user is not required to be online.

Figure 4:
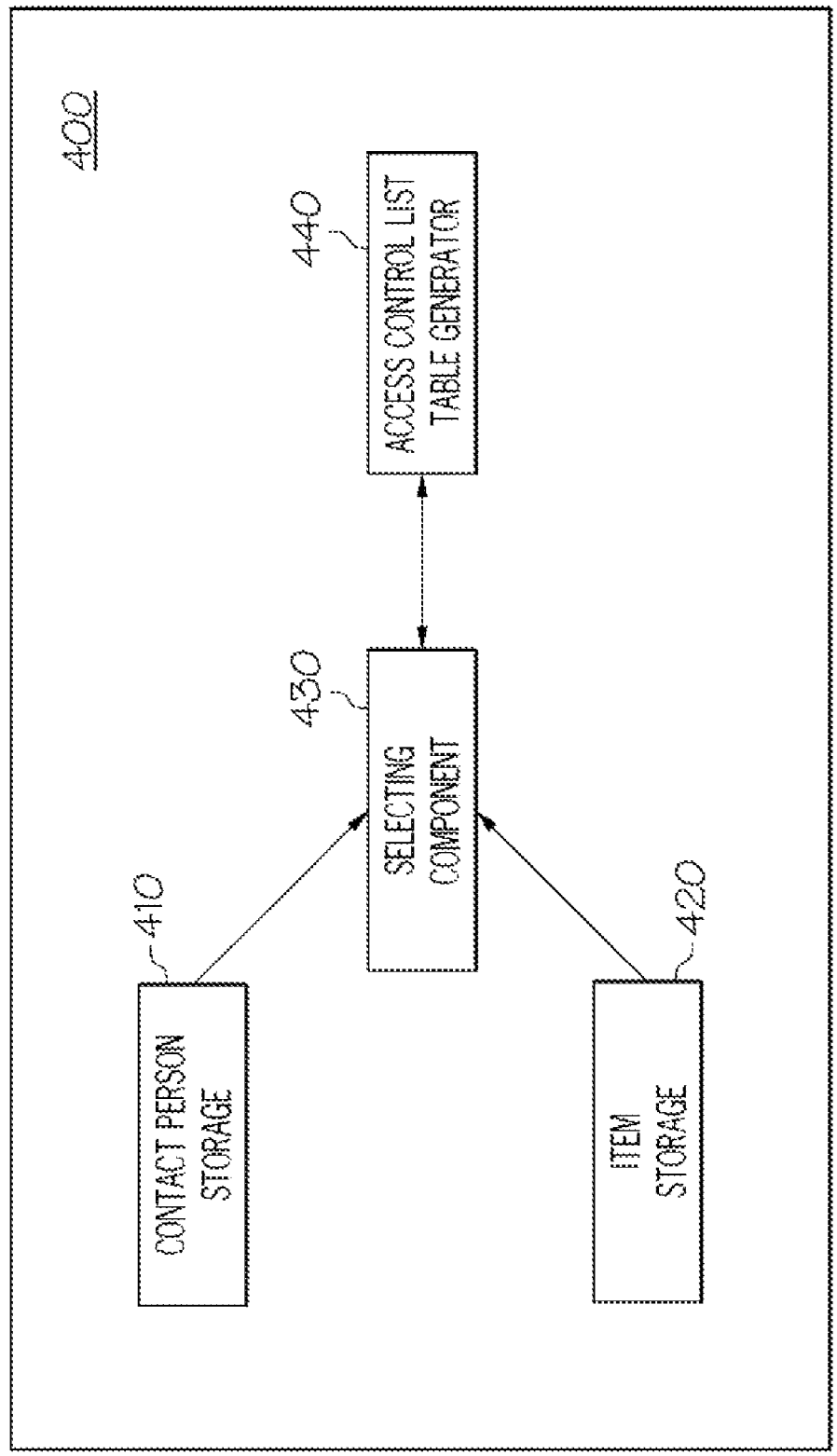
FIG. 4 is a structural configuration of a sharing source client according to the present invention when the source client is sharing files and/or folders.

FIG. 4 shows a structural view of the source client according to the present invention when sharing out/folders. As shown in FIG. 4, the source client 400 includes contact person storage 410, item storage 420, a selecting element 430 and an access control list table generator 440.

The contact person storage 410 stores information identifying possible contact persons. For different IM software, the identifying information may be email addresses of the contact persons (as the user interface 100 of Lotus Sametime software in FIG. 1 shows), or QQ number of the contact persons or other information identifying the contact persons. In the description, unless otherwise indicated, the "contact persons" can represent both a single contact person of a user and contact persons appearing in the form of a group of users (i.e., a contact group).

The item storage 420 can be a memory for storing files/folders of the source client, for example, a hard disc drive, a floppy disc drive, an optical disc drive or other media for storing files. At least some of the files stored in the item storage 420 are to be shared with other contact persons.

The selecting component 430 is a mechanism for selecting (from the contact person storage 410) the contact persons whom the source is willing to share share files/folders form the item store 420. The selecting component 430 may have a plurality of operating modes. If the user interface where the selectable contact persons and files have been listed as shown in FIGS. 2A and 2B is used, the selecting component 430 can be a hardware input means such as a keyboard, mouse, stylus, touch panel, microphone, etc. so that the user can make a direct selection; if the user interface does not list the selectable contact persons and/or files, then the selecting component 430 can further comprise a corresponding software input means such as a text box, so that the user can use the keyboard and the like to input the files an/or folders to be selected.

The access control list table generator 440 is for generating an access control list table, based on selections from the contact person storage 410 and the item storage 420. The access control list table can be generated through one of the following ways.

After a user, for example, selects a special contact person or files/folders for sharing with the contact person through one of the three modes mentioned in the "Modifications to User Interface" section, the user can manually fill complete the access control list table.

Or, according to a preferred mode of the present invention, after the user selects the contact persons and the files/folders for sharing with those contact persons, the source client 400 can automatically extract the information corresponding to respective fields of the access control table list so as to automatically fill in the data structure of the access control list table.

In this situation, the access control list table generator 440 may further comprise: an extracting component (not shown) for extracting information corresponding to respective fields of an access control list table, responsive to the selection of target users and share items; and a filling component (not shown) for filling the data structure of the access control table list with the extracted information. Since the contact person and the shared files/folders are selected or input by the user, it is easily understood that the extracting component of the source client 400 can obtain this information.

In fact, the present invention needs an access control list table to store necessary information therein so as to control the access by a source client. Therefore, so long as the necessary information can be stored in this list table, whatever specific mode for the storage (or, whatever mode for the generation of the list table) will not affect the implementation of the present invention.

Figure 5:
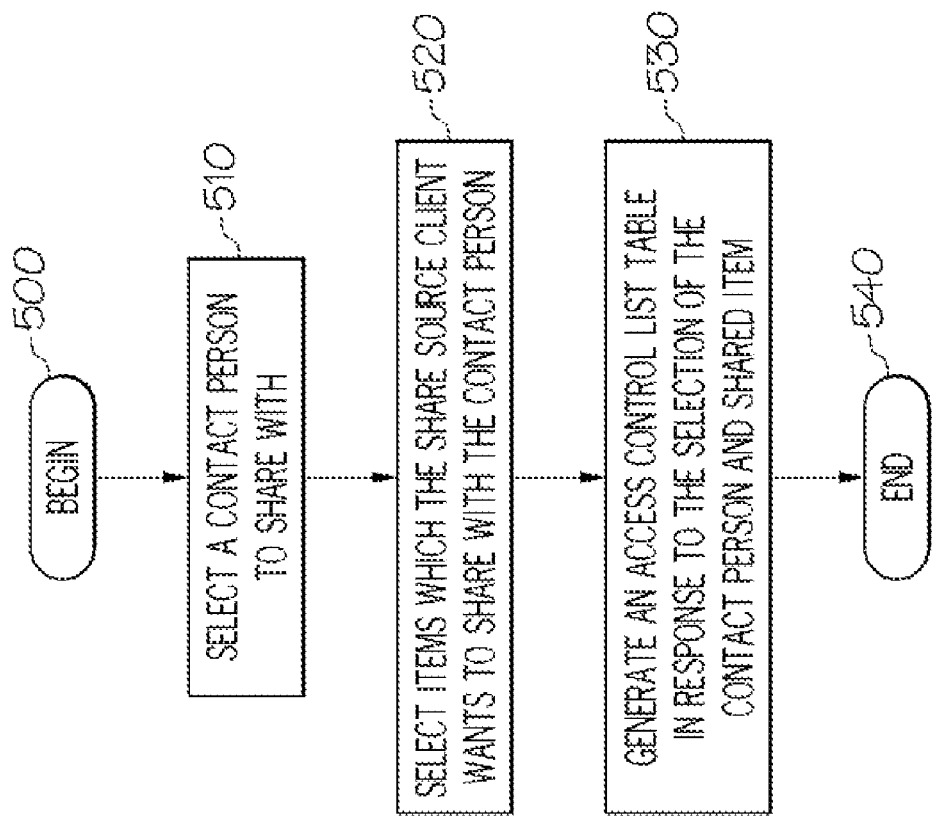
FIG. 5 is an operation flow chart of a sharing source client according to the present invention when the source client initiates sharing of files and/or folders.

FIG. 5 shows an operation flow chart of source client 400.

The operations begin with Step 500 and then proceed to Step 510. The source user selects the contact persons he wants to share with from a contact person list in Step 510 and selects the files/folders shared out to the contact persons in Step 520. After these two selection operations, the source user extracts identification information of the contact persons and identification information of items shared to the contact persons so as to generate an access control list table. Subsequently, the method ends in Step 540.

Those skilled in the art can understand that, the executive sequence of Steps 510 and 520 in FIG. 5 can be changed without affecting the implementation of the present invention. Furthermore, the operation of the Step 530 can be either manually completed by the source user or automatically executed by the source client 400.

Configurations and Operations of Parties when Target Client Wants to Obtain Information Relevant to Items Shared by Source Client After a source client takes the steps to enabling sharing of items, a target client can, for example, request the source client for information relevant to the items (briefly called "share item information") through the user interface and operations as shown in FIG. 3. The share item information includes but is not limited to attribute, size, creation time, etc. of the items (e.g., files/folders). After obtaining the information, the target client can determine whether to actually request file/folder transfer based on the information.

The structures and operations of the parties in this process are described as follows.

1. Target Client

Figure 6:
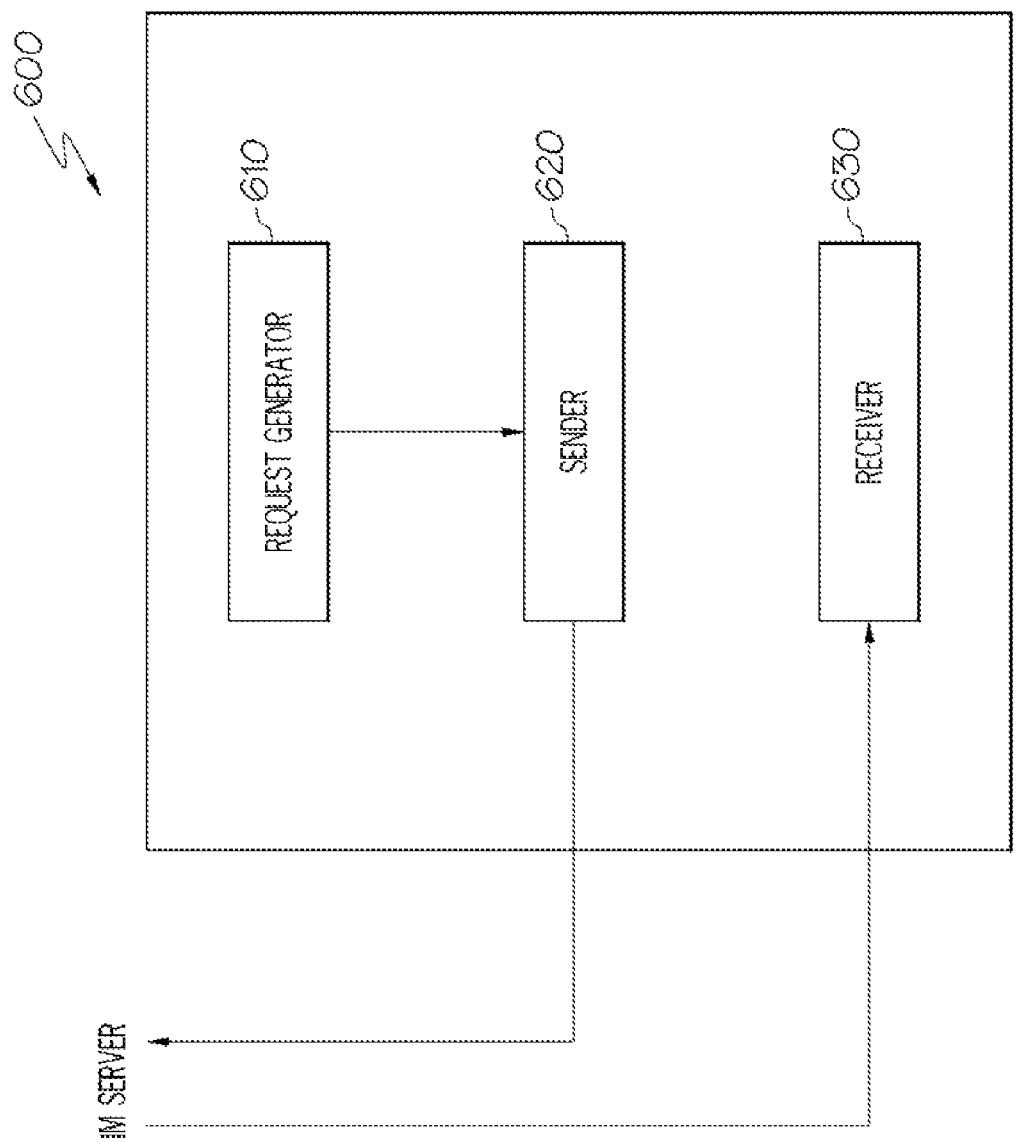
FIG. 6 is a structural configuration of a sharing target client when the target client wants to obtain information about shared items.

FIG. 6 shows a structural view of s target client 600. The client 600 comprises a request generation component 610, a sender 620 and receiver 630.

When a user selects the "view shared files . . . " menu item as shown in FIG. 3, the request generation component 610 generates a request for share item information and adds some parameters to the request. These parameters include but are not limited to: ID of the source client and designating information of the shared items.

The ID of the source client is sent in the request so the IM server is able to know from which source client information is requested and can forward the request to the appropriate source client.

The designating information of the share items is for designating which share items the target client 600 wants to obtain information about. The designating information of the share items can be the following three types:

1) If the target user wants to make a request for information of all the items shard, an identifier such as "\" and the like can be used as the designating information of the share items. This is usually performed when the user makes an initial request or he does not know the item names.
2) If the target user makes a request for information of items with one share name, the share name can be sent as the designating information of the share items.
3) If the share item information which the user wants to obtain is information about particular files or sub-folders under a share name, then the relative path of the special files or sub-folders to the share name can be specified together with the share name, as the designating information of the share items.

Regarding the second and third types, the target client 600 may probably have previously made a request and obtained the share item information from the source client. The share item information obtained from the source client may be stored locally by the target client 600 for later use.

In addition, according to one preferred mode of the present invention, the parameters of the request can further include an identifier of the target client 600 itself.

The request generated by the request generator 610 is sent to the IM server via the sender 620.

After the IM server receives the request from the target client 600, if the request has no identifier of the target client 600 itself, then the server will automatically extract the identifier from the request and forward the identifier along with the request to the source client. If the parameters of the request include the identifier of the target client 600 itself, the server will directly forward the request to the source client. After receiving the request, the source client will, according to whether the request is authorized, give a corresponding response and return the response to the target client 600 through the IM server (as described below).

The receiver 620 of the target client 600 receives, from the IM server, the response from the source client.

Figure 7:
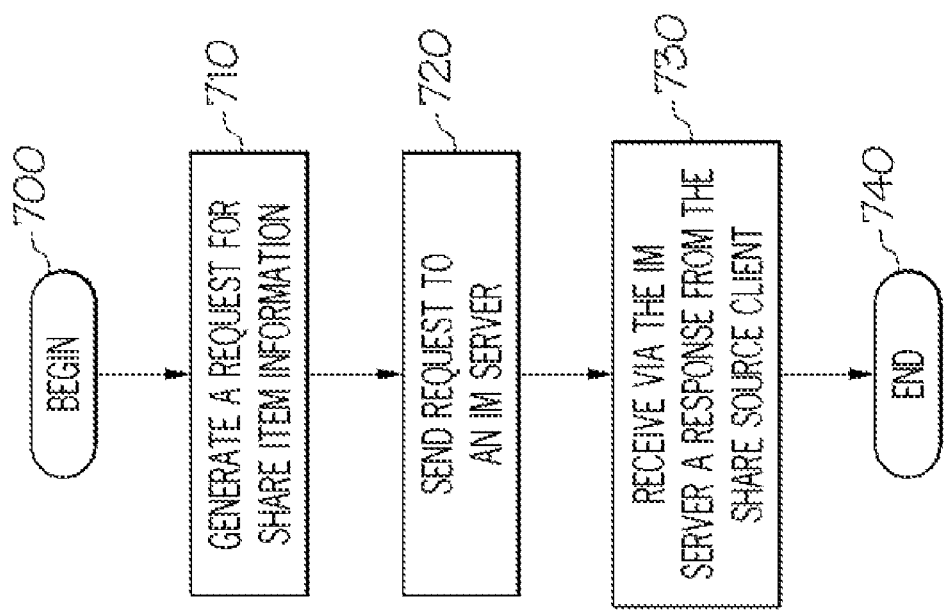
FIG. 7 is a flow chart of a method executed by a sharing target client.

The flow chart of a method executed by the target client 600 is as shown in FIG. 7.

This method begins with Step 700 and proceeds to Step 710. In Step 710, the target client 600 generates a request for share item information in response to the user's request operation, the request including some parameters as abovementioned. In Step 720, the request is sent to the IM server. In Step 730, the target client 600 receives through the server the response from the source client to the request. This method ends in Step 740.

2. Source Client

Figure 8:
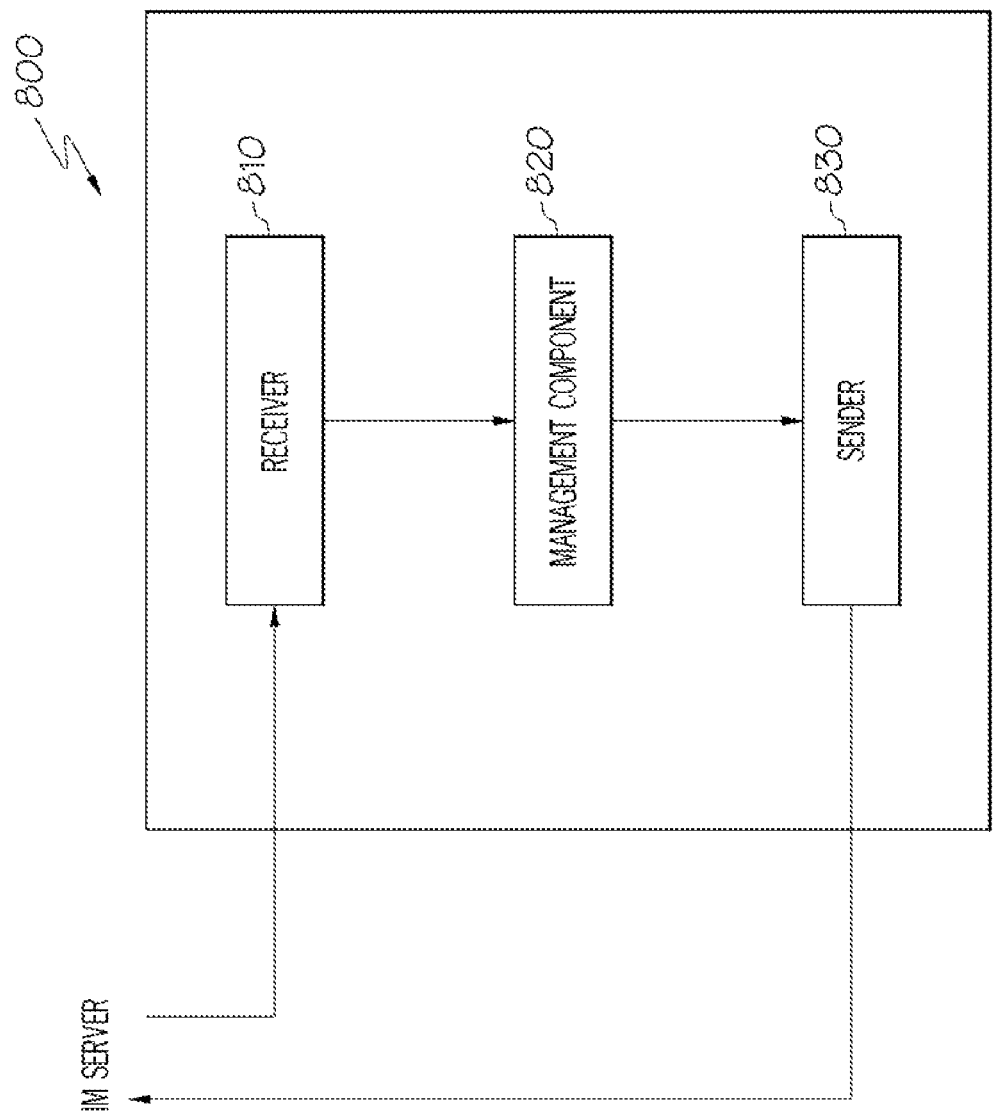
FIG. 8 is a structural configuration of a sharing source client.

FIG. 8 shows a structural view of a source client 800. The client 800 comprises a receiver 810, a management component 820 and a sender 830.

The receiver 810 is for receiving from the IM server a request from the target client 600 for share item information. As described above, this request includes a plurality of parameters.

The receiver 810 transfers the received request to the management component 820. The management component 820 can realize a management thread for determining whether the request is authorized by consulting an access control list table according to the parameters added in the request and outputting different response results depending on whether the request is authorized.

When the request is authorized, the response result is the same item information requested by the target client 600. When the request is not authorized, the response result may be error information.

The sender 830 is for sending the result output from the management means 820 to the IM server so that the result can be further returned to the target client 600.

According to the present invention, the management component 820 can determine whether the request is authorized through two modes.

In the first mode, the management component 820 first compares the identifier of the target client 600 and the contact person list of the source client 800. If the target client 600 is one of the contact persons, the identifier of the target client 600 and the designating information of the share items are checked against the access control list table so as to determine whether there exists a match. If the match exists, the request is determined to have been authorized. Otherwise, error information will be returned.

The second mode is similar to the first mode, and the difference lies in that the management component 820 directly compares the identifier of the target client 600 and the access control list table of the source client 800. If the identifier of the target client 600 exists in the access list table, then the subsequent operation is substantially the same as those in the first mode. Otherwise, the error information will be returned.

Figure 9:
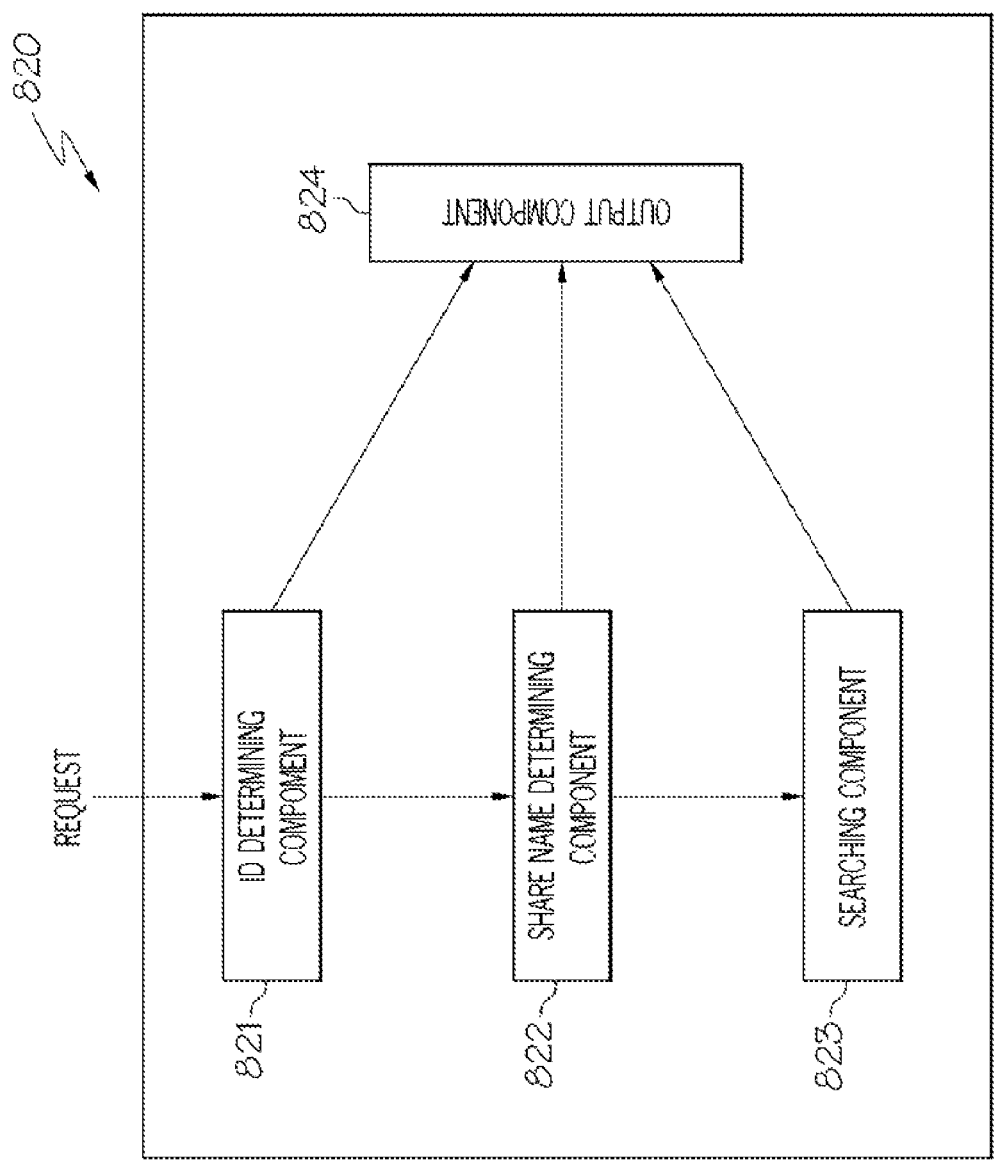
FIG. 9 is a further configuration of a management component.

FIG. 9 shows the further structure of the management component 820, comprising ID determining component 821, share name determining component 822, searching component 823 and outputting component 824.

In the first mode, the ID determining component 821 is for, by accessing the contact person storage 410 as shown in FIG. 4, comparing the identifier of the target client 600 and the identifier of the contact person stored in the contact person storage so as to determine whether the identifier of the target client 600 is in the contact person list; or in the second mode, the ID determining component 821, by accessing the access control list table, compares the identifier of the target client 600 and the user ID in the access control list table so as to determine whether the identifier of the target client 600 is in the access control list table.

The share name determining component 822 determines whether there is a match for the identifier of the target client 600 and the share name provided in the request in the access control list table by consulting the access control list table.

The searching component 823 is for, when the share name determining component 822 determines a match, searching a local file system of the source client 700 for the information of files/folders corresponding to the share name (probably in combination with their relative path) provided in the request, and the information includes but is not limited to the attribute, size, creation time, etc. of the files/folders.

The output component 824, on one hand, outputs error information when the ID determining component 821 or the share name determining component 822 determines there is no match, and on the other hand, when they both determine a match, the output component 824 outputs the information searched by the searching means 823.

The operation of the searching component 823 is further explained as follows.

Responsive to the share name determining component 822 finding a match, the searching component 823 searching the access control list table for an absolute path corresponding to the share name and according to the absolute path corresponding to the share name (and also according to the relative path provided in the request if the relative path is not null), finds the absolute path of the items requested, and obtains the information of share items from the file system to be output by the output component 824.

Take the case in the above-mentioned Table 1 as an example, suppose a target user "User 1" only provides a share name "My Music", then the absolute path of the "My Music" folder corresponding to the share name, which can be found for User 1 from the access control list table, is "C:\Documents and Settings\peter\My Documents\My Music". The system obtains the information of the "My Music" folder and its subfolders from the local file system and returns. Suppose User 1 provides not only a share name "My Music" but also a relative path, e.g., "Faye Wong\track01", then it shows that User 1 wants to obtain the information relating to the "track01" file in the sub-folder "Fay Wong" of "My music" folder. According to the absolute path corresponding to the share name plus the relative path, the system obtains the absolute path of the file requested by the user, which is "C:\Documents and Settings\peter\My Documents\My Music\Faye Wong\track01", and then the system obtains the file information from the local file system and returns.

Figure 10:
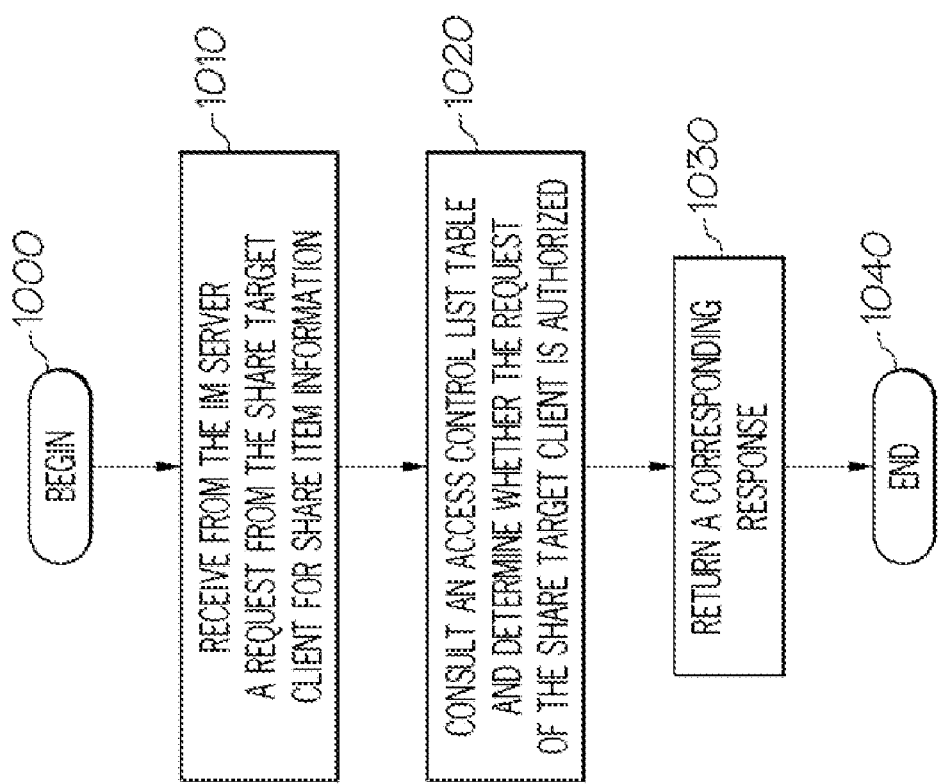
FIG. 10 is a flow chart of a method executed by a sharing source client.

FIG. 10 shows a flow chart of a method executed by the source client 800.

The method begins with Step 1000 and proceeds to Step 1010. In Step 1010, the source client 800 received from the IM server a request for share item information from the target client 600, the request including a plurality of parameters as described above. After the request is received, the method consults an access control list table in Step 1020 and determines whether the request of the target client 600 is authorized according to the parameters included in the request. Responsive to the determination that the request is authorized, the item information requested is sent to the IM server in Step 1030, or responsive to the determination that the request is unauthorized, error information is sent to the IM server in Step 1030 so as to be finally forwarded to the target client 600. This method ends in Step 1040.

Figure 11:
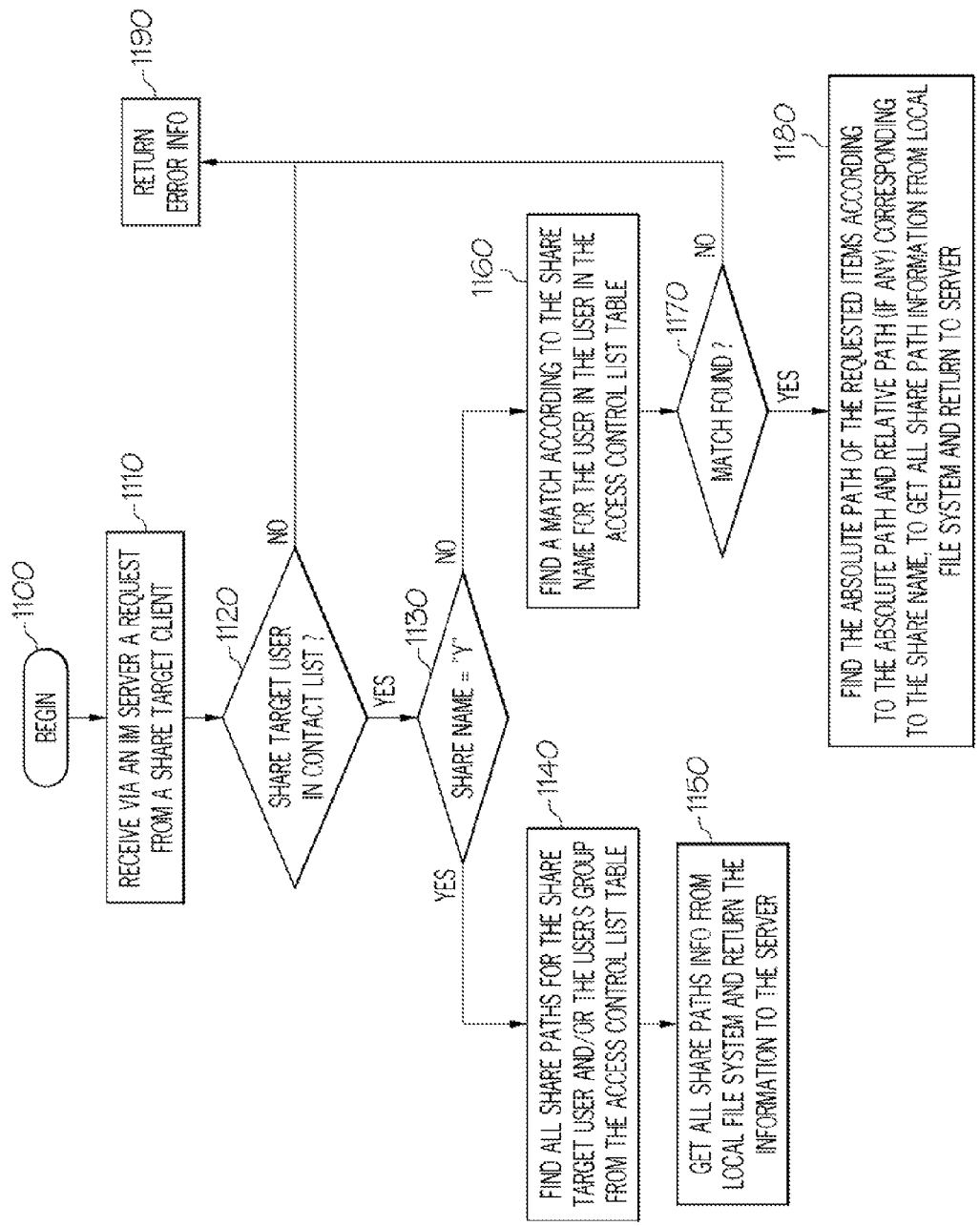
FIG. 11 is a flow chart of a method executed by a sharing source client according to the preferred mode for carrying out the present invention.

FIG. 11 shows a flow chart of a method executed by the source client 800 according to a preferred mode of the present invention.

The method begins with Step 1100 and then proceeds to Step 1110. In Step 1110, as described above, the source client 800 received from the IM server a request for share item information from the target client, the request including a plurality of parameters.

In Step 1120, the source client 800 determines whether the target user is in the contact person list. If the determination result is "yes", the method proceeds to Step 1030.

In Step 1130, the method further determines whether the share name included in the request is "\". When the target user provides "\" as a share name, it shows he wants to obtain information of all the share items associated to him, and this situation usually occurs when the user makes a first request for share item information. Or if the user does not know the share name of the share items on the source client 800, "\" can also be used as a share name. It should be understood that, "\" is only used as an example, and other expressions can also be used to show a request for all the item information.

If it is determined to be "Yes" in Step 1130, then the method proceeds to Step 1140. In Step 1140, by consulting an access control list table, the source client 800 finds the absolute paths of all the items available to the target user. This probably includes an absolute path of the item available to the user himself and/or an absolute path of the items available to the user group of the user.

Next, in Step 1150, according to the found absolute path, the source client 800 finds from the local file system the share item information which includes but is not limited to creation time, size and attribute of the share items, and then sends the information to the IM server so that the information is finally returned to the target client 600.

If it is determined to be "No" in Step 1130, namely that the share name is not "\" but a specific share name, then the method proceeds to Step 1160. In this situation, the target client usually knows what items the source client are available to him, so he wants to know the information of the specific files or folders. In Step 1160, the method searched a match according to the share name provided in the request.

Next, in Step 1170, the method determines whether a match for the share name provided by the source client 800 was found in the access control list table.

If the match is found, then the method proceeds to Step 1180. In Step 1180, the method searches the access control list table for an absolute path corresponding to the share name and according to the absolute path corresponding to the share name (and also according to the relative path provided in the request if the relative path is not null), finds the absolute path of the items requested, and obtains the information of share items from the file system to send it to the IM server so that the information is finally returned to the target client 600. If it is determined no match can be found in Step 1170, then the method proceeds to Step 1190, in which error information is sent to the IM servers as to be finally returned to the target client 600.

If it is determined to be "No" in Step 1120, namely that, the user who sends a request for share item information to the source client 800 is not in the contact person list of the source client 800, the method directly proceeds to Step 1190, and the method terminates by returning the error information to the target client 600.

In addition, if it is found in the searching operation process of Steps 1150 and 1180 that the items previously shared out no longer exist in the local source client 800 due to deletion, movement or other reasons, the error information will also be returned to the target client 600.

It should be pointed out that, in the method as shown in FIG. 11, the method determines in Step 1120 whether the target client 600 is in the contact person list of the source client 800. However, in Step 1120, the method can also directly determine whether the user making a request is in the contact person list of the source client 800, so that the user making a request can be initially limited to the ones present in the access control list table.

3. IM Server

Figure 12:
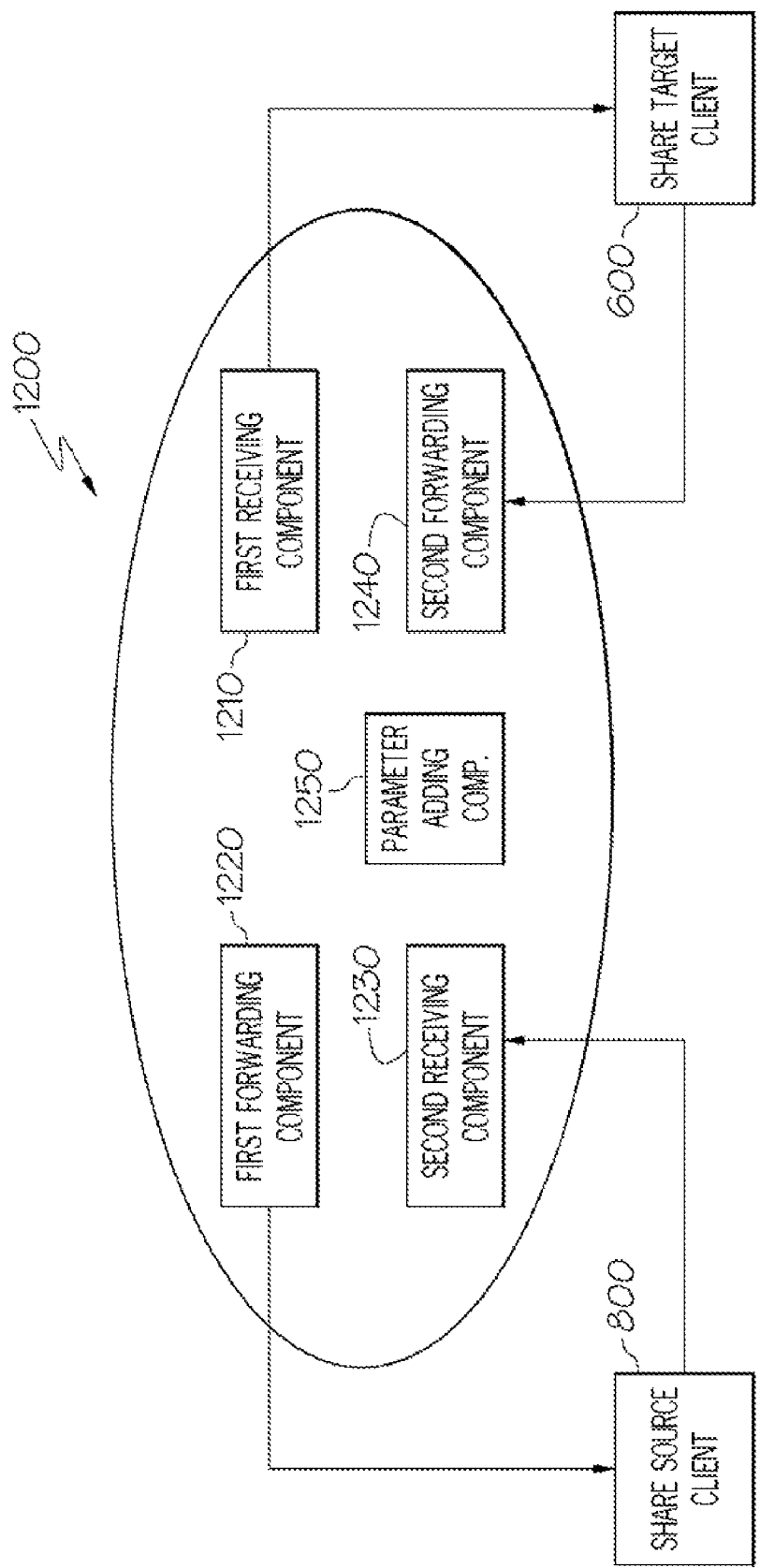
FIG. 12 is a structure configuration of an IM server.

FIG. 12 shows a structural view of an IM server 1200.

The IM server 1200 may be connected to a plurality of IM clients. However, here for conveniently explaining the principles of the present invention, only two IM clients are shown, namely, the target client 800 and the source client 600.

In order to implement the present invention, the IM server 1200 comprises a first receiver 1210, a first forwarding component 1220, a second receiver 1230 and a second forwarding component 1240. A parameter adding component 1250 represented by dotted lines is an optional component of the IM server 1200.

The first receiver 1210 is for receiving from the target client 600 a request for share item information.

The request received from the first receiver 1210 will be forwarded to the source client 800 via the first forwarding component 1220.

After performing the above operations described by reference to FIG. 11, the source client 800 sends a response to the IM server 1200, and this response is received by the second receiver 1230.

The second forwarding component 1240 forwards again the response received by the second receiver 1230 to the target client 600.

According to the preferred mode of the present invention, the IM server 1200 can further comprise a parameter adding component 1250. The parameter adding component 1250 functions in that when the request for share item information from the target client 600 does not include an identifier of the target client 600, the IM server 1200 automatically extracts the identifier and adds it to the request to be forwarded together by the first forwarding component 1220.

It should be understood that, the operation that the IM server 1200 obtains the identifier of the IM client communicating with the IM server 1200 is known in the field and can be realized by conventional technology. Therefore, it is unnecessary to go into details.

Figure 13:
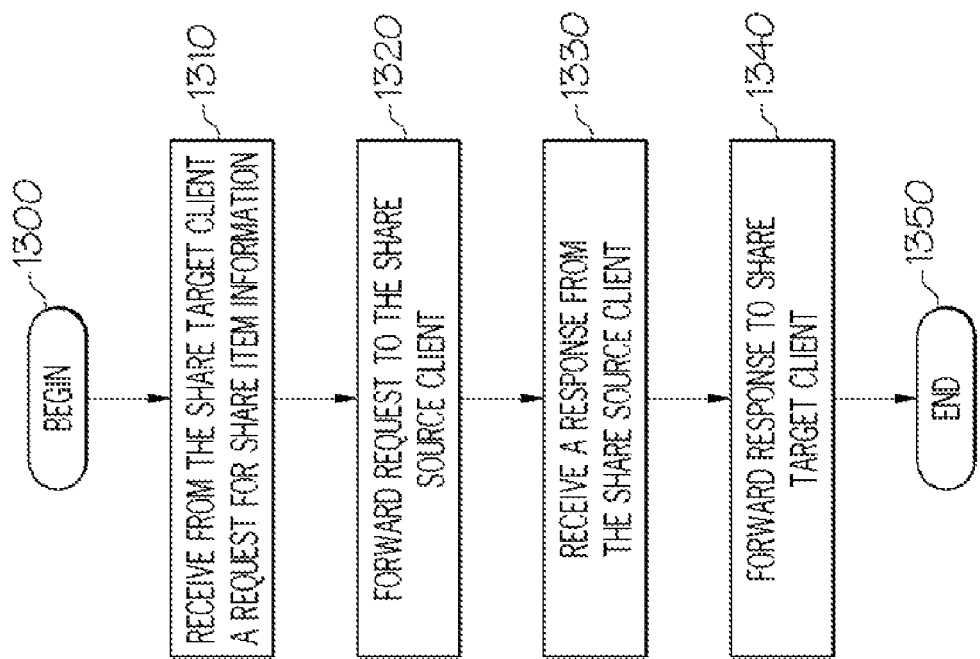
FIG. 13 is a flow chat of a method executed by an IM server.

FIG. 13 is a flow chart of a method executed by the IM server 1200.

This method begins with Step 1300 and then proceeds to Step 1310. In Step 1310, the IM server 1200 receives from the target client 600 a request for the information relating to the items shared out. Subsequently, in Step 1320, the request is forwarded to the source client 800. In addition, after performing the above operations described by reference to FIG. 11, the source client 800 receives a response in Step 1330. However, in Step 1340, the response is forwarded to the target client 600. This method ends in Step 1350.

In addition, Step 1320 can further comprise the operation of adding the identifier parameter of the target client to the request.

Configurations and Operations of Parties when Target Client Makes a Request to Source Client for Beginning to Receive Share Items After making the request and viewing the share item information, the target client decides to begin to receive the items shared out by the source client.

The structures and operations of the parties in the process will be described as follows.

1. Target Client

Figure 14:
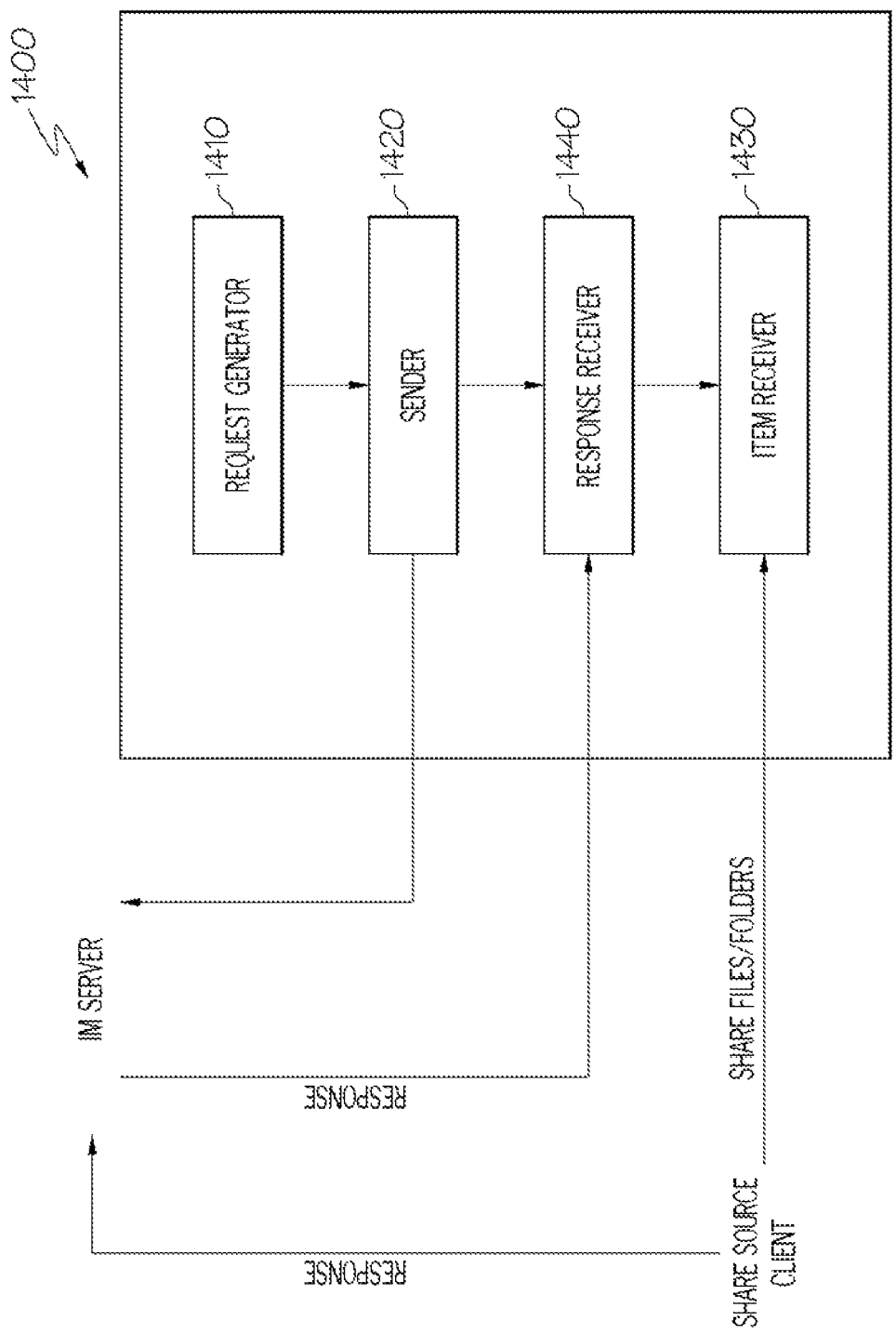
FIG. 14 is a structural configuration of a sharing target client when the target client makes a request for items from a sharing source client.

FIG. 14 shows a structural view of a target client 1400. The client 1400 comprises request generator 1410, sender 1420 and item receiver 1430. A response receiver 1440 represented by dotted lines is an optional component of the present invention.

For example, when a target user selects the operation of beginning to receive share items on the IM software user interface (not shown), the request generator 1410 will generate a request for beginning to receive share items and add some parameters to the request. These parameters comprise but are not limited to ID of the source client and designating information of the shared items.

The ID of a source client is to enable the IM server to know to which source client the request is being made so that the request can be forwarded to it.

The designating information of share items is for indicating what share items the target client 1400 wants to obtain. The designating information of share items can have the following three types:

1) if the target user wants to make a request for all the shared items as to himself, an identifier such as "\" and the like can be used as the designating information of share items.
2) if the target user wants to make a request for items with one certain share name, then the share name can be sent as the designating information of share items.
3) If the share items which the user wants to obtain are specific files or sub-folders under one certain share name, then the relative path of the special files or subfolders to the share name can be specified together with the share name, as the designating information of the share items.

Moreover, according to the preferred mode of the present invention, the request can further comprise the following parameters:
- a. Identifier of the target client 1400 itself;
- b. Parameters for item transfer:
  - b1. IP address of the target client 1400 for item transfer;
  - b2. Port address for item transfer;
  - b3. item transfer session ID for item transfer verification and/or item transfer encryption, wherein the ID can be an ID generated randomly by the target client 1400.

The parameters for item transfer are determined or generated by the target client 1400. These parameters can be either added to the request by the target client 1400 when the request is generated or added to the request by the IM server after the request is sent to the IM server.

The request generated by the request generation means 1410 will be sent to an IM server through the sender 1420.

If the request received by the IM server does not comprise parameters a, b1, b2 and b3, then the server will add these parameters to the request and then forward the request to the source client.

After receiving the request, the source client will determine whether the request for beginning item reception is authorized. If yes, the source client will establish a communication connection with the target client 1400 according to the parameters for item transfer comprised in the request (as described below).

Therefore, the item receiver 1430 of the target client 1400 is connected to the source client through the communication connection established based on the parameters comprised in the request so as to receive the items requested.

According to the preferred mode of the present invention, the target client 1400 further comprises a response receiver 1440 for receiving from the source client a response relating to whether the request is authorized through the IM server.

Specifically, on one hand, when the source client determines that the request is authorized, besides establishing the communication connection with the target client 1400, the source client can further send a response that the request is authorized to the IM server and then the IM server forwards it to the target client 1400. On the other hand, when the source client determines that the request is unauthorized, then the error information can be forwarded to the target client 1400 through the IM server.

Figure 15:
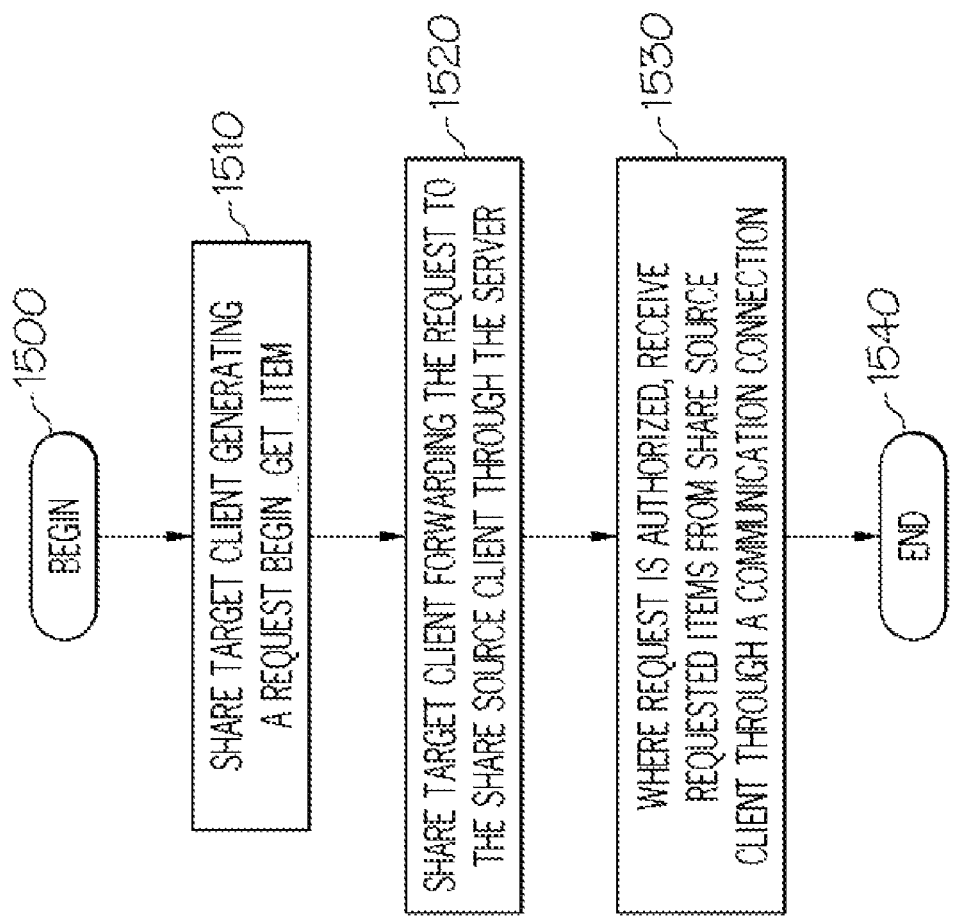
FIG. 15 is a flow chart of a method executed by a sharing target client.

The flow chart of a method executed by the target client 1400 is as shown in FIG. 15.

This method begins with Step 1500 and then proceeds to Step 1510. In Step 1510, the target client 1400 generates a request for beginning item reception and adds to the request at least the ID of the source client and the designating information of the shared items as parameters. In Step 1520, the request for beginning item reception is sent to the IM server so as to be forwarded to the source client, and the identifier of the target client 1400 and the parameters for item transfer are further added to the request reaching the source client. In Step 1530, in the case where the request is authorized, the target client 1400 is connected to the source client through the communication connection established based on the parameters comprised in the request and receives the items requested. This method according to the invention ends in Step 1540.

2. Source Client

Figure 16:
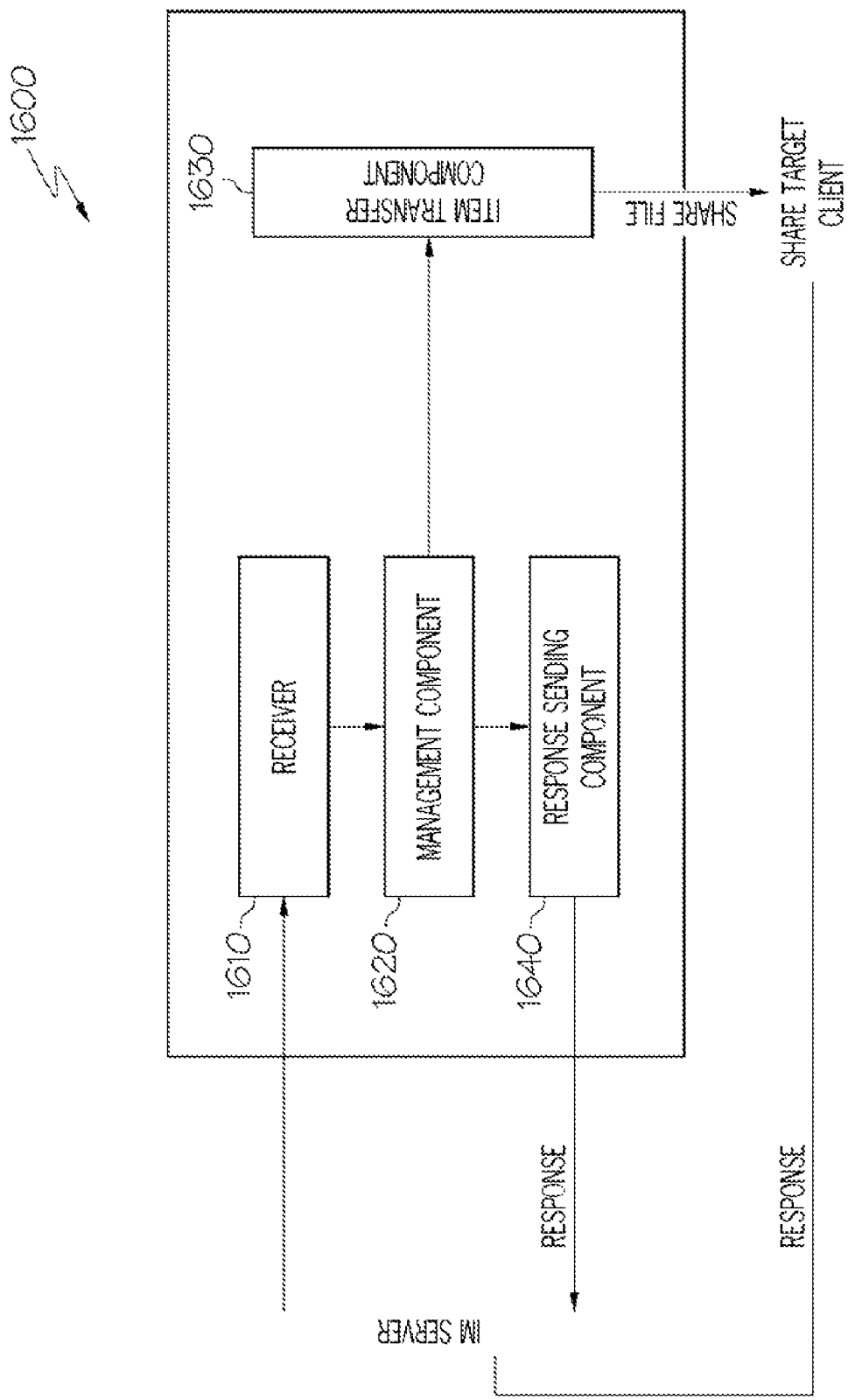
FIG. 16 is a structural configuration of a sharing source client.

FIG. 16 shows a structural view of a source client 1600. The client 1600 comprises receiver 1610, management component 1620 and item transfer component 1630. Response sender 1640 represented by dotted lines is an optional component in the present invention.

The receiver 1610 is for receiving from the IM server a request from the target client 1400 for beginning to receive share items. As described above, this request comprises a plurality of parameters.

The receiver 1610 transfers the received request to the management means 1620. The management means 1620 can be realized as a management thread for determining whether the request is authorized according to the parameters comprised in the request by consulting an access control list table and decides on item transmission depending on whether the request is authorized.

The item transfer means 1630 establishes a communication connection with the target client 1400 according to the parameters for establishing the communication connection sent in the request and transfers the files/folders requested to the target client 1400.

According to the present invention, the management component 1620 can determine whether the request is authorized through two modes as follows.

In the first mode, after receiving the request, the management component 1620 first determines whether the user exists in the contact person list of the source client 1600. If yes, it shows the request is authorized. If not, the name of a user group which the user belongs to is obtained and a search is made in the access control list table whether there is a match path name according to the name of the group, the share name and other information. If yes, it also shows the request is authorized.

In the second mode, after receiving the request, the management component 1620 first determines whether the user exists in the access control list table of the source client 1600. If the user exists, then the subsequent operations are similar to those in the first mode. If not, the request is not authorized. In this way, the user making a request can be initially limited to the ones present in the access control list table.

Figure 17:
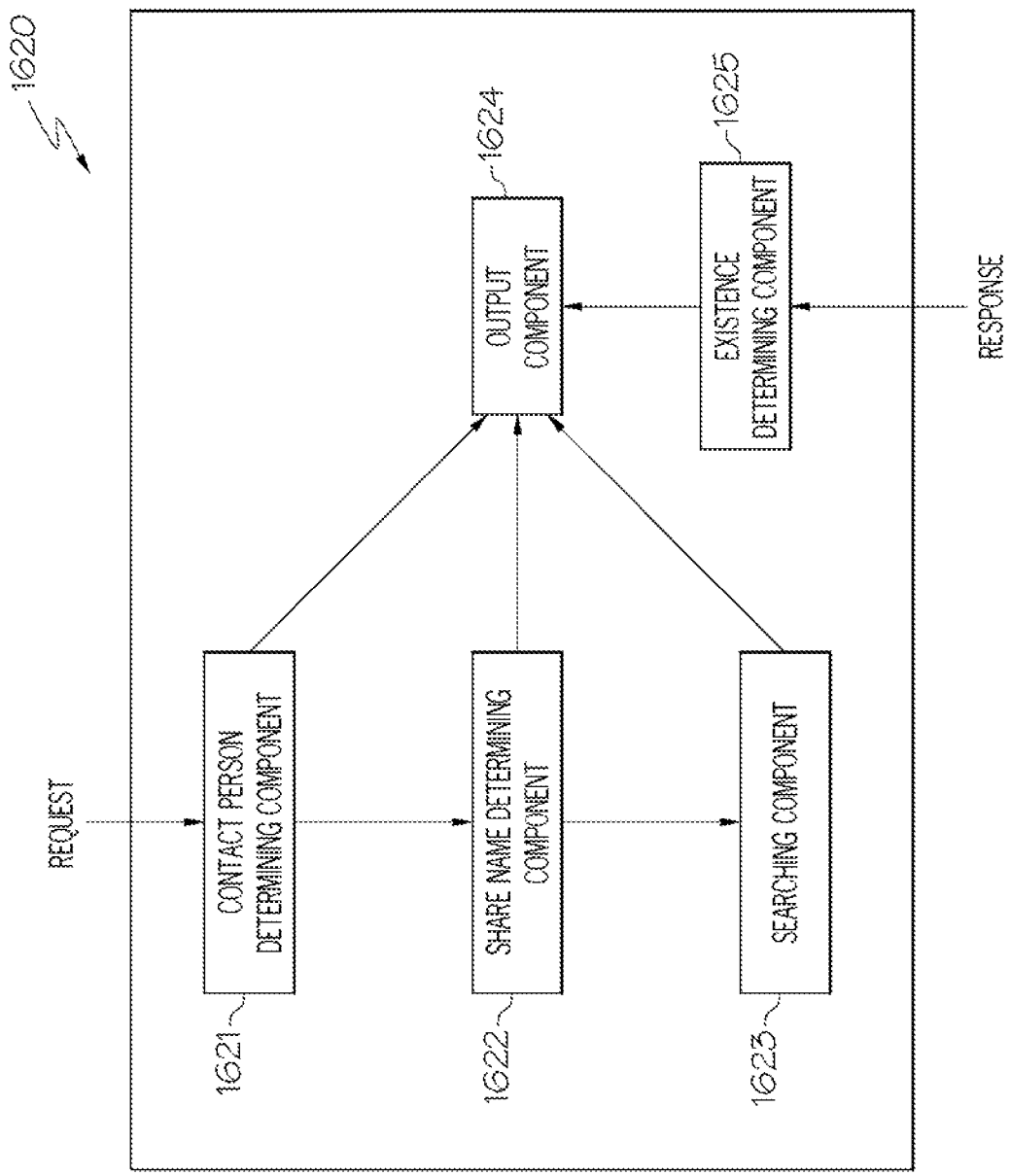
FIG. 17 shows a further configuration of a management component.

FIG. 17 shows the further structure of the management component 1620, comprising contact person determining component 1621, path name determining component 1622, absolute path obtaining component 1623 and output component 1624.

In the first mode, the contact person determining component 1621 is, through the contact person storage 410 as shown in FIG. 4, used for comparing the identifier of the target client 1400 and the identifier of the contact person in the contact person storing means or the identifier of the user group in the contact person storing means so as to determine whether the target client 1400 is a contact person of the source client 1600; or in the second mode, the contact person determining component 1621 is, through the access control list table, used for comparing the identifier of the target client 1400 and the ID of the user in the access control list table so as to determine whether the identifier of the target client 1400 is in the access control list table.

The path name determining means 1622, through the access control list table, determines whether there is a match in the access control list table for the identifier of the target client 1400 or the identifier of the user group thereof, and the share name provided in the request.

The absolute path obtaining means 1623 is used for obtaining the absolute path of the item requested when the path name determining component 1622 determines a match. The mode of the absolute path obtaining component 1623 for obtaining the absolute path is similar to the mode through which the searching component 823 obtains the absolute path as shown in FIG. 9.

The output component 1624, on one hand, outputs error information when the contact person determining component 1621 or the path name determining component 1622 determines there is no match, and on the other hand, when they both determine a match, the output component 1624 notifies the item transfer means 1630 to trigger the establishment of a communication connection and outputs the information showing the request is accepted.

Furthermore, the management component further preferably comprises existence determining component 1625, which determines whether the files requested exist and is used for determining whether the files/folders requested by the target client 1400 exist according to the found absolute path. If, after the target client makes a request for viewing the share item information, the source client deleted the previously shared items from the local file system, then it is necessary to perform such a determination. If the existence determining component 1625 determines the items requested are absent, then the output means 1624 can output error information.

In addition, according to a preferred mode of the present invention, the source client 1600 further comprises response transfer component 1640 for transferring the output result of the output component 1634 to the IM server so as to further return it to the target client 1400.

Figure 18:
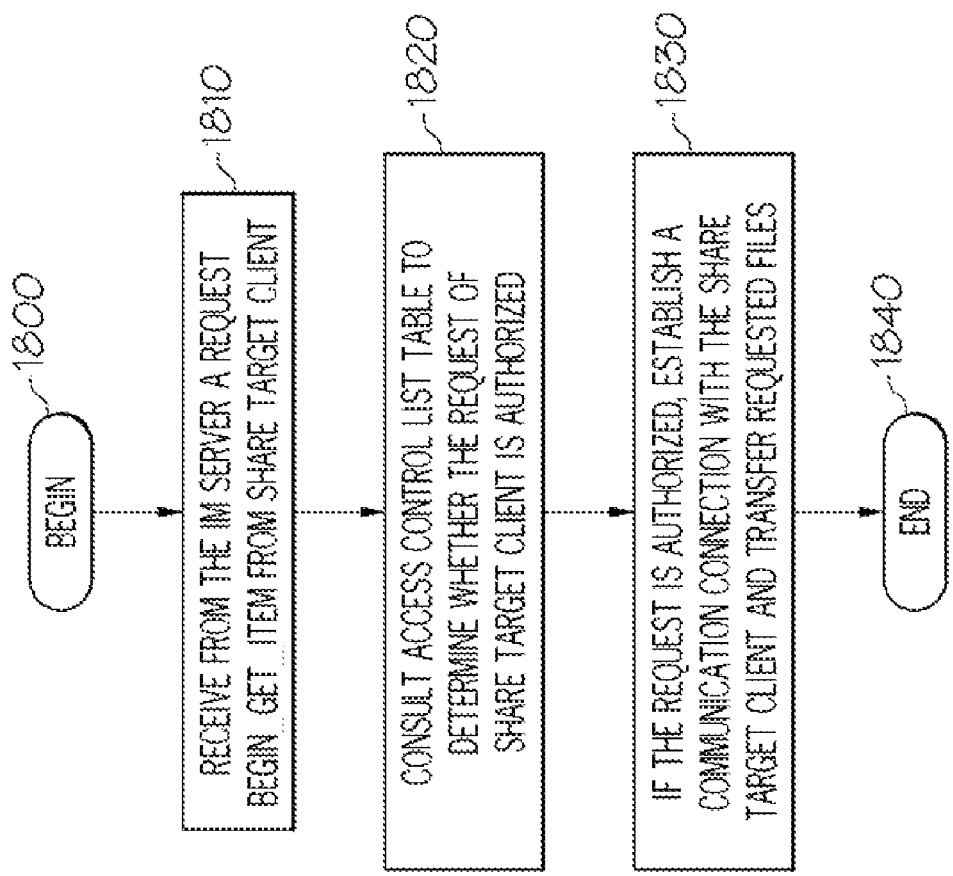
FIG. 18 is a flow chart of a method executed by a sharing source client.

The flow chart of a method executed by the source client is as shown in FIG. 18.

This method begins with Step 1800 and proceeds to Step 1810. In Step 1810, the source client 1600 receives from the IM server a request for share items from the target client 1400, and as described above, the request comprises a plurality of parameters.

After the request is received, the method, in Step 1820, consults an access control list table to determine whether the request of the target client 1400 is authorized.

If the request is determined to be authorized in Step 1820, then the method proceeds to Step 1840, in which a communication connection with the target client 1400 is established according to the parameters for establishing the communication connection sent in the request and the files/folders requested are transferred to the target client 1400.

Next, this method ends in Step 1840.

In addition, according to one preferred mode of the present invention, a communication connection can be established on one hand and the information showing the request is accepted is sent to the IM server on the other hand under the situation where the request is authorized, in response to the determination that the target client 1400 has access authority, or responsive to the determination that the target client 1400 has no access authority, no communication connection is established and error information is transferred to the IM server so as to be finally forwarded to the target client 1400.

Figure 19:
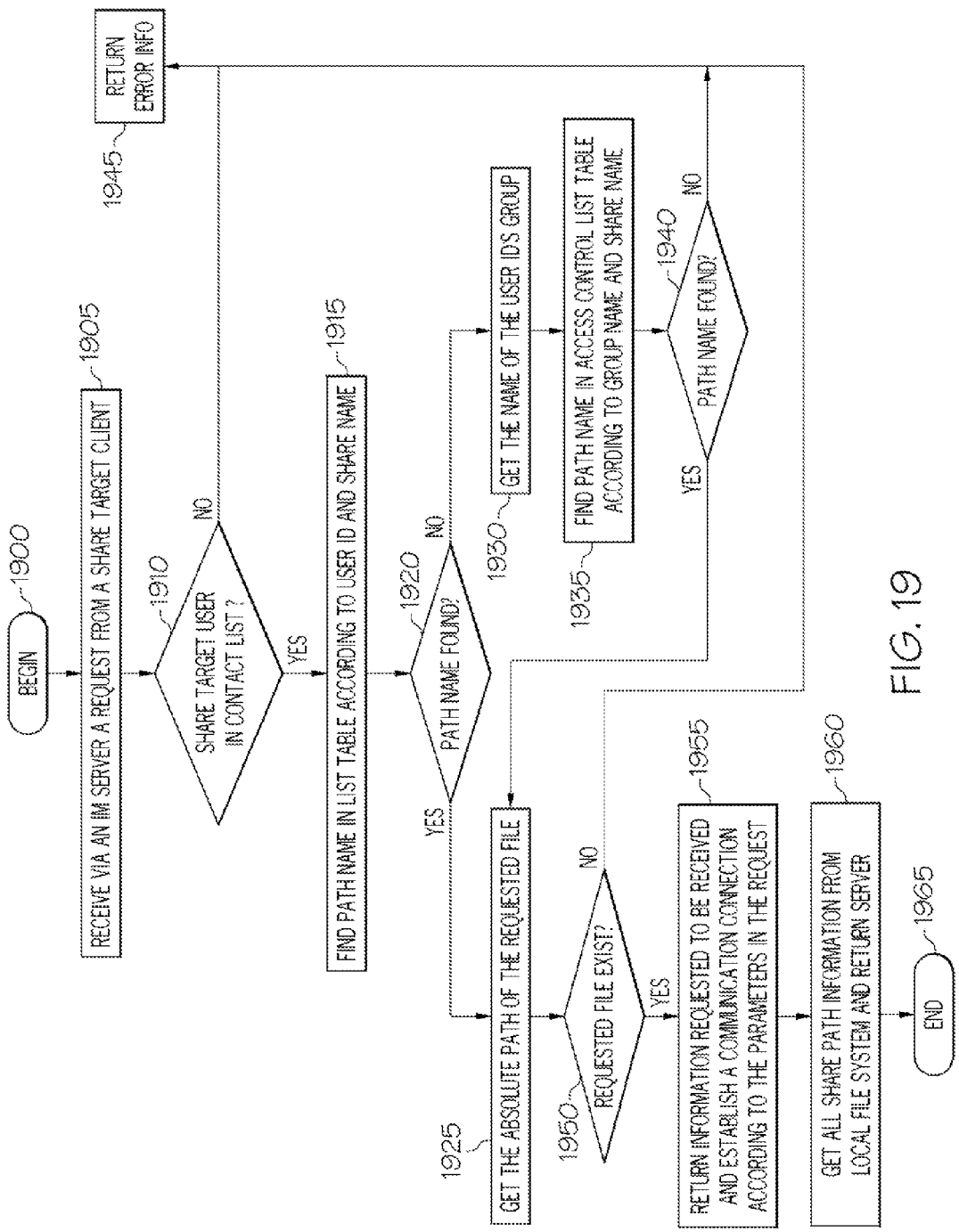
FIG. 19 is a flow chart of a method executed by a sharing source client according to a preferred mode for carrying out the present invention.

FIG. 19 shows the flow chart of a method executed by the source client 1600 according to the preferred mode of the present invention.

This method begins with Step 1900 and then proceeds to Step 1905. In Step 1905, as described above, the source client 1600 receives from the IM server a request from the target client 1400 for beginning to receive share items, the request comprising a plurality of parameters as above described.

In Step 1910, the source client 1600 determines whether the target client is in the contact person list.

If the determination result is "Yes", then the method proceeds to Step 1915. In Step 1915, the access control list table is searched for the path name according to the use ID and the share name, etc.

In Step 1920, whether the path name is found is determined. If the path name is found ("Yes" branch), then the method proceeds to Step 1925 so as to obtain the absolute path name of the files/folders requested.

If it is determined in Step 1920 that no path name is found, then the method proceeds to Step 1930, in which the name of the group to which the user ID belongs to is obtained. In Step 1935, the access control list table is searched to see whether there is a match path name according to the group name and the share name.

In Step 1940, a determination is made whether the match path name is found. If yes, then the method turns to Step 1925 to obtain the absolute path name of the files/folders requested. If the determination result in Step 1940 "No", then the method proceeds to Step 1945 to return error information, showing the request for obtaining items is unauthorized.

Moreover, if the determination result in Step 1910 is "No", then the method directly proceeds to Step 1945 to return error information and finish the method.

After obtaining the absolute path of the files requested by executing Step 1925, the method proceeds to Step 1950 to determine whether the files/folders requested still exist on the source client.

If it is determined to be "Yes" in Step 1950, the method proceeds to Step 1955.

In Step 1955, on one hand, the information showing the request is accepted is returned, and on the other hand, a link with the target client is established according to the parameters for establishing file transmission link as comprised in the request.

Next, in Step 1960, the files requested are transferred to the target client. Then, this method ends in Step 1965.

Additionally, if it is determined to be "No" in Step 1950, the method of the present invention turns to Step 1945 in the same way so as to return error information and finish the method.

It should be pointed out that, in the method as shown in FIG. 19, it is determined in Step 1910 whether the user making a request is in the contact person list of the source client 1600. However, in Step 1910, it can also be determined whether the user making the request is in the contact person list of the source client 1600, so that the user making the request can be initially limited to the those existing in the access control list table.

3) IM Server

Figure 20:
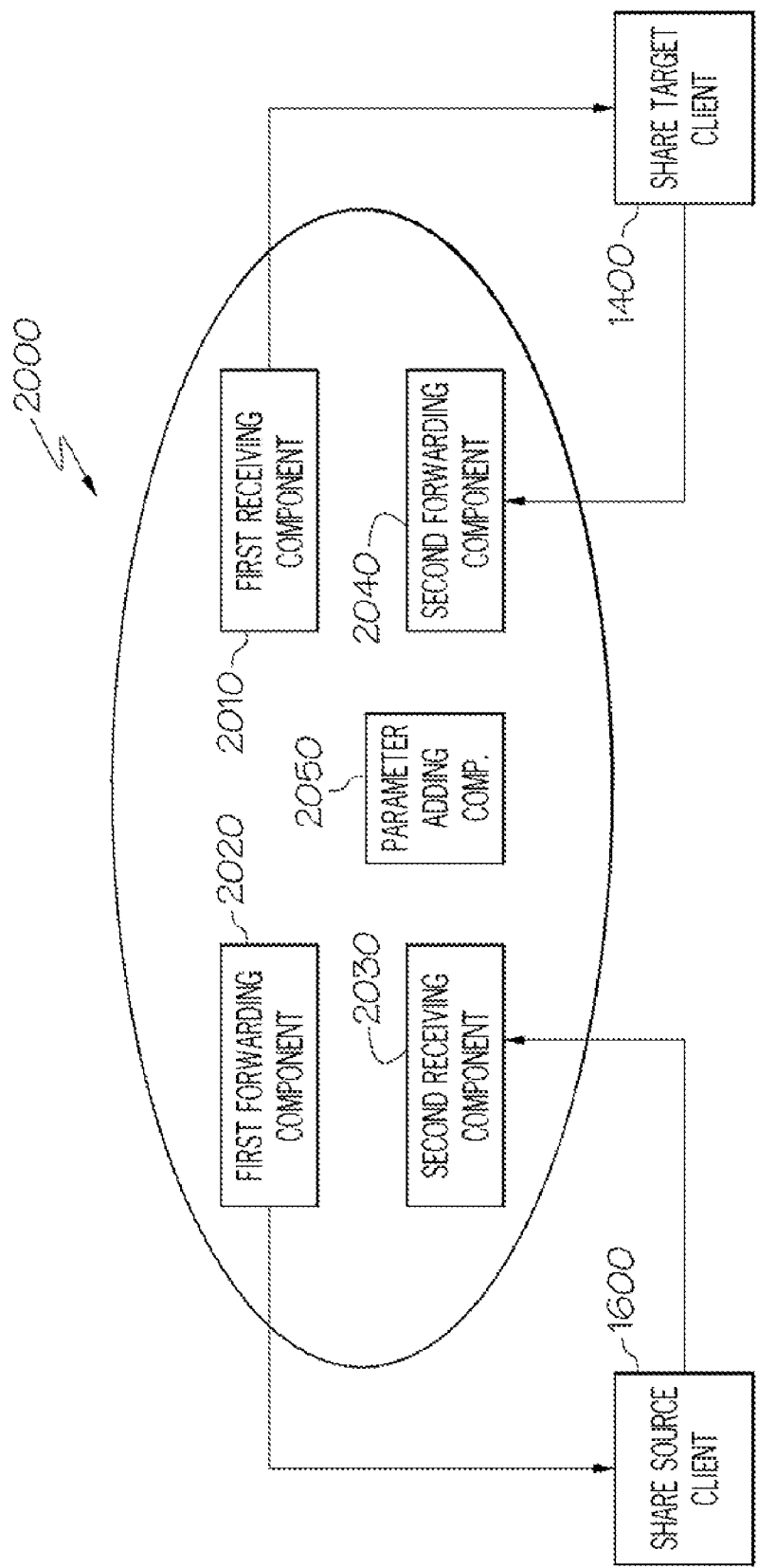
FIG. 20 is a structural configuration of an IM server.

FIG. 20 shows a structural view of an IM server 2000.

The IM server 1200 is connected to a plurality of IM clients. However, here for convenience sake, only two IM clients are shown, namely, the target client 1400 and component. In order to implement the present invention, the IM server 2000 includes a first receiver 2010, a first forwarding component 2020, a second receiver 2030 and a second forwarding component 2040, and a parameter adding component 2050. Component 2050 is an optional component of the IM server 2000.

The first receiver 2010 is for receiving from the target client 1400 a request for beginning to receive share items.

The request received from the first receiver 2010.

According to the preferred mode of the present invention, the IM server 2000 can further comprise a parameter adding means 2050. The parameter adding means 2050 functions in that when the request for share item information from the target client 1400 does not include an identifier of the target client 1400 or does not include the respective parameters (as above-mentioned) necessary for establishing a file transmission link with the source client 1600, the IM server 2000 automatically extracts the identifier and parameters and adds it to the request to be forwarded together by the first forwarding component 2020.

In additionally, according to the preferred mode of the present invention, when performing the above operations as shown in FIG. 18, the source client 1600 can also return the information whether the request for obtaining files is accepted to the target client 1400 via the IM server 2000. In this situation, this information can be received by the second receiver 2030. The second forwarding means 2040 forwards to the target client 1400 the response received by the second receiver 2030.

Figure 21:
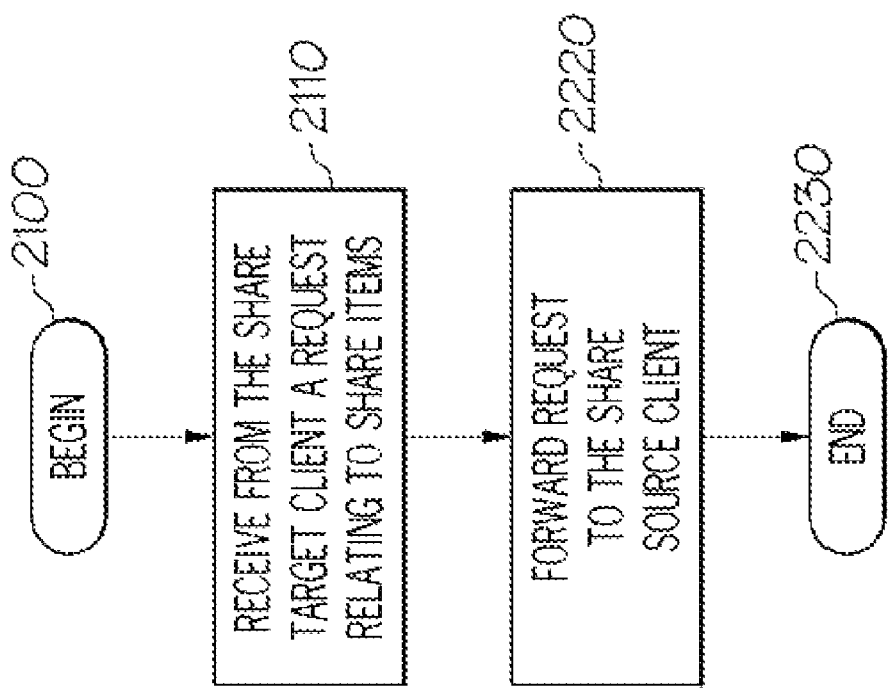
FIG. 21 is a flow chart of a method executed by an IM server.

FIG. 21 is a flow chart of a method executed by the IM server 2000.

This method begins with Step 2100 and then proceeds to Step 2110. In Step 2110, the IM server 2000 receives from the target client 1400 a request for share items. Subsequently, in Step 2120, the request is forwarded to the source client 1600. This method ends in Step 1350.

Operations of Requesting to Obtain Items Before Beginning to Receive Items

The above describes structures and operations of parties before the target client 1400 begins to receive share items, by referring to FIGS. 14-21. According to the present invention, the operations of beginning to receive share items can be directly performed after the target client makes a request for share item information as shown in FIGS. 7-13.

However, if after a request for share item information is made, the operation of beginning to receive share items is not performed for a long time, then the items or information thereof on the source client may be altered (e.g., deleted, updated, etc.). As a result, once the share item begin to be received, these items may be absent or altered.

Therefore, in the above-mentioned situation, for assurance, the "Request_Obtain_Item" operation can be first performed before the share items begin to be received (namely, performing the operations of FIG. 18 or 19), so as to ensure that the items to be obtained still exist and the source client is enabled to prepare for item transmission.

Figure 22:
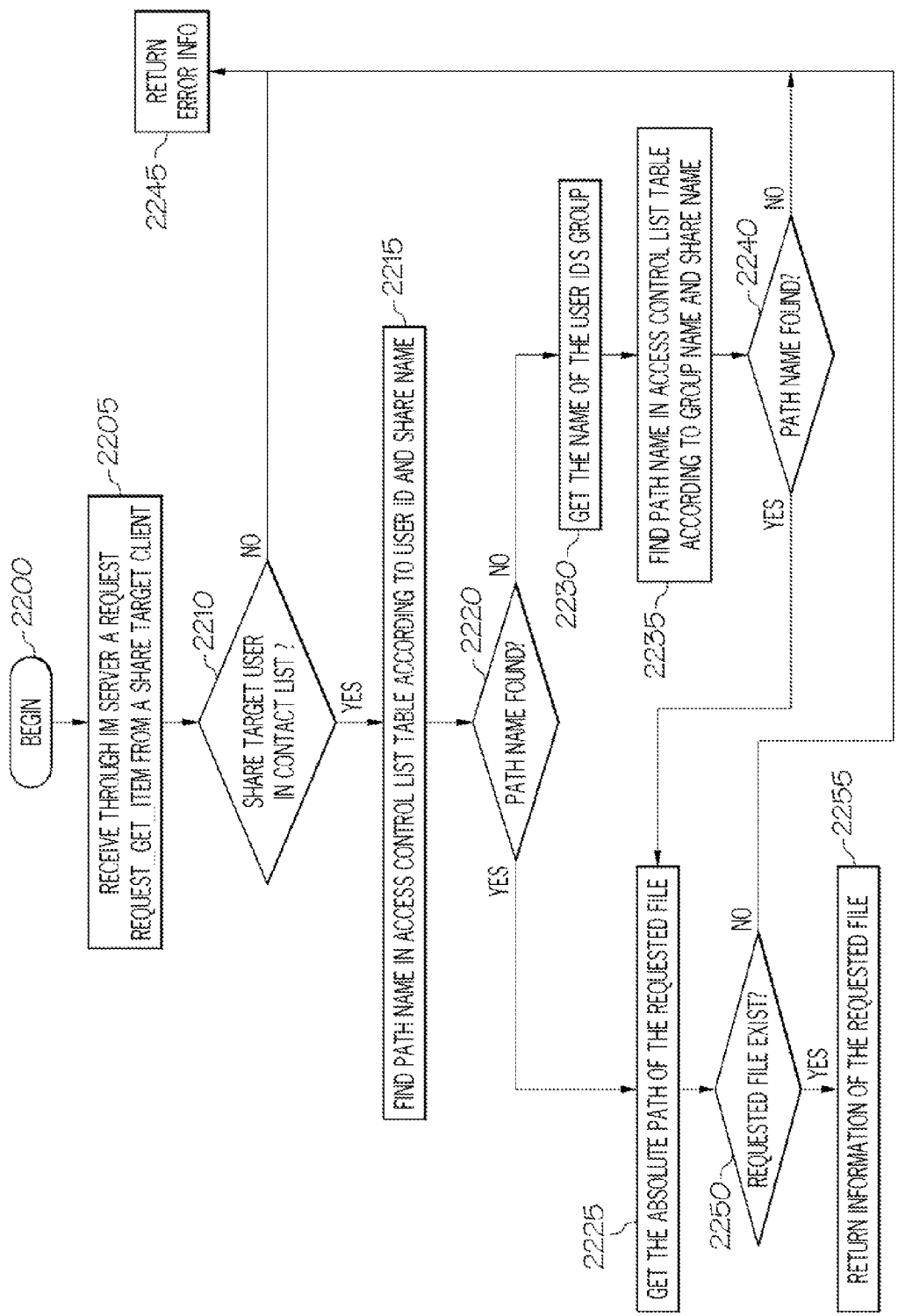
FIG. 22 is a flow chart of the operation for making a request for obtaining items.

FIG. 22 shows a flow chart of the operation of requesting to obtain items.

It can be seen that, the operations of FIG. 22 are similar to those of FIG. 19 and only two differences exist.

The first difference is that in Step 2205, the IM server receives a "Request_Obtain_Item" request form the target user, instead of the "Being_Receive_Items" request.

The second difference is that in Step 2255, when the files requested are determined to exist, only the operations of obtaining and returning information of the requested items are performed, but the operations of establishing a communication connection to transfer items are not performed.

The operations of FIG. 22 are preferably executed due to the following aspects.

First, when files begin to be received, they ensure the files still exist and the target client knows the latest file information.

Second, it is the "Request_Obtain_Items" request that is sent in the operations of FIG. 22. Once the source client receives this request, in the situation where the request is determined to be authorized, the source client will make initialization preparations for file transfer (for example, copying the share files to the buffer area and the like) and waits for the "Begin_Obtain_Items" request. Compared with that, the "Obtain_Share Item_Information" request is sent in the operations of FIG. 11, and when the source client receives the "Obtain_Share Item_Information" request, it only obtains the corresponding file information.

Third, the operations in FIG. 22 also determines whether the request is authorized, so this can further improve security.

In the present invention, the communication between the IM clients and the server is guaranteed by IM software.

The file sharing in the present invention differs from the file sharing in the Windows operating system in that, it is unnecessary for the present invention to activate a file share daemon. Instead, the present invention performs file sharing only in accordance with a request.

In the present invention, although the final file transfer is performed through a direct communication between two IM clients, this communication connection is established through the communication with the server. In addition, before this connection is established, whether the request is authorized should be verified, so it is easy to assure the secure file transfer between two IM clients.

In addition, the file transfer between two clients is peer-to-peer in the present invention, which will not affect the performance of the server.

The present invention is described above mainly by taking music file/folder share as example, but those skilled in the art will understand that, the implementation of the present invention is irrelevant as to the type of files/folders for sharing. The solution of the present invention can be used to share any types of files/folders, comprising but not limited to audio, video, image or text files.

Those skilled in the art will understand that, all the functions described in the IM server and clients can be realized through software by correspondingly programming a processor, or realized through hardware logic elements, or realized by the combination thereof. In addition, the components performing communication between the respective elements and used for transmission, reception and forwarding can be realized through a wired network or a radio network interface and so on.

As described above, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may be embodied in a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in one or more computer-readable memories, where each such memory can direct a computer or other programmable data processing apparatus to function in a particular manner.

The above preferred embodiments in connections with the present invention explain the principles of the present invention. The above explanation is merely exemplary and should not be understood as limiting the present invention. Based on the above explanation, those skilled in the art may make modification to the present invention. However, these modifications are within the scope and spirit of the invention as defined in the claims.

What is claimed is:

1. A method, comprising:
    at a first instant messaging (IM) client device:
        detecting a selection of a contact from a displayed instant messaging contact list;
        detecting a selection of at least one file stored within a local memory of the first IM client device to share with the selected contact;
        determining a quantity of the selected at least one file;
        automatically creating, for each of the determined quantity of the selected at least one file stored within the local memory of the first IM client device, a row in a shared file access control list table that controls access to the local memory of the first IM client device, where the shared file access control list table is stored within the local memory of the first IM client device;
        automatically extracting information corresponding to fields of each created row in the shared file access control list table from one of an entry in the instant messaging contact list associated with the selected contact, and, for each created row, a share path to a storage location within the local memory of the shared at least one file associated with each row; and
        automatically filling at least one field of each created row in the shared file access control list table with the extracted information corresponding to the at least one field.

2. The method of claim 1, further comprising:
    automatically creating a sharename for each of the shared at least one file; and
    automatically filling, for each created row, a sharename field with the created sharename for the shared at least one file associated with each row.

3. The method of claim 1, further comprising encrypting each created row in the shared file access control list table.

4. The method of claim 1, further comprising:
    receiving, at the first IM client device, a first request from a second IM client device for shared file information, a client device identifier associated with the second IM client device, and an item transfer session identifier (ID);
    identifying within the instant messaging contact list a contact associated with the client device identifier;
    searching the at least one automatically created row in the shared file access control list table that controls access to the local memory of the first IM client device for an entry associated with the identified contact in one of the fields of the at least one automatically created row;
    determining whether the second IM client device is authorized to receive the shared file information based upon an identification of the entry associated with the identified contact in one of the fields of the at least one automatically created row; and
    preparing, in response to determining that the second IM client device is authorized, at least one shared file associated with each row determined to comprise the identification of the entry associated with the identified contact.

5. The method of claim 4, where the item transfer session ID comprises a randomly generated item transfer session ID that is generated in association with the first request by the second IM client device.

6. The method of claim 4, further comprising:
    receiving, at the first IM client device, a second request for information on share items from the second IM client device comprising the item transfer session ID; and
    sending the information on share items associated with each row determined to comprise the identification of the entry associated with the identified contact in response to receiving the second request for information on share items from the second IM client device comprising the item transfer session ID.

7. The method of claim 4, further comprising:
    sending an error to the second IM client device in response to determining that the second IM client device is unauthorized to access files stored in the local memory of the first IM client device.

8. The method of claim 1, where detecting the selection of the contact from the displayed instant messaging contact list comprises detecting a selection of a group from the displayed instant messaging contact list.

9. An apparatus, comprising:
    a memory; and
    a processor programmed to:
        detect a selection of a contact from a displayed instant messaging contact list;
        detect a selection of at least one file stored within the memory to share with the selected contact;
        determine a quantity of the selected at least one file;
        automatically create, for each of the determined quantity of the selected at least one file stored within the memory, a row in a shared file access control list table that controls access to the memory, where the shared file access control list table is stored within the memory;
        automatically extract information corresponding to fields of each created row in the shared file access control list table from one of an entry in the instant messaging contact list associated with the selected contact, and, for each created row, a share path to a storage location within the memory of the shared at least one file associated with each row; and
        automatically fill at least one field of each created row in the shared file access control list table with the extracted information corresponding to the at least one field.

10. The apparatus of claim 9, where the processor is further programmed to:
    automatically create a sharename for each of the shared at least one file; and
    automatically fill, for each created row, a sharename field with the created sharename for the shared at least one file associated with each row.

11. The apparatus of claim 9, where the processor is further programmed to encrypt each created row in the shared file access control list table.

12. The apparatus of claim 9, where the processor is further programmed to:
    receive a first request from an IM client device for shared file information, a client device identifier associated with the IM client device, and an item transfer session identifier (ID);
    identify within the instant messaging contact list a contact associated with the client device identifier;

search the at least one automatically created row in the shared file access control list table that controls access to the memory for an entry associated with the identified contact in one of the fields of the at least one automatically created row;

determine whether the IM client device is authorized to receive the shared file information based upon an identification of the entry associated with the identified contact in one of the fields of the at least one automatically created row; and prepare, in response to determining that the IM client device is authorized, at least one shared file associated with each row determined to comprise the identification of the entry associated with the identified contact.

13. The apparatus of claim 12, where the processor is further programmed to:

receive a second request for information on share items from the IM client device comprising the item transfer session ID; and send the information on share items associated with each row determined to comprise the identification of the entry associated with the identified contact in response to receiving the second request for information on share items from the IM client device comprising the item transfer session ID.

14. A computer program product comprising a computer readable storage medium including computer readable program code, wherein the computer readable program code when executed on a computer causes the computer to:

detect a selection of a contact from a displayed instant messaging contact list;

detect a selection of at least one file stored within a local memory of the computer to share with the selected contact;

determine a quantity of the selected at least one file;

automatically create, for each of the determined quantity of the selected at least one file, a row in a shared file access control list table that controls access to the local memory of the computer, where the shared file access control list table is stored within the local memory of the computer;

automatically extract information corresponding to fields of each created row in the shared file access control list table from one of an entry in the instant messaging contact list associated with the selected contact, and, for each created row, a share path to a storage location within the local memory of the computer of the shared at least one file associated with each row; and automatically fill at least one field of each created row in the shared file access control list table with the extracted information corresponding to the at least one field.

15. The computer program product of claim 14, where the computer readable program code when executed on the computer further causes the computer to:

automatically create a sharename for each of the shared at least one file; and automatically fill, for each created row, a sharename field with the created sharename for the shared at least one file associated with each row.

16. The computer program product of claim 14, where the computer readable program code when executed on the computer further causes the computer to encrypt each created row in the shared file access control list table.

17. The computer program product of claim 14, where the computer readable program code when executed on the computer further causes the computer to:

receive a first request from an IM client device for shared file information, a client device identifier associated with the IM client device, and an item transfer session identifier (ID);

identify within the instant messaging contact list a contact associated with the client device identifier;

search the at least one automatically created row in the shared file access control list table that controls access to the local memory of the computer for an entry associated with the identified contact in one of the fields of the at least one automatically created row;

determine whether the IM client device is authorized to receive the shared file information based upon an identification of the entry associated with the identified contact in one of the fields of the at least one automatically created row; and prepare, in response to determining that the IM client device is authorized, at least one shared file associated with each row determined to comprise the identification of the entry associated with the identified contact.

18. The computer program product of claim 17, where the computer readable program code when executed on the computer further causes the computer to:

receive a second request for information on share items from the IM client device comprising the item transfer session ID; and send the information on share items associated with each row determined to comprise the identification of the entry associated with the identified contact in response to receiving the second request for information on share items from the IM client device comprising the item transfer session ID.

* * * * *